United States Patent
Fujita et al.

(10) Patent No.: US 11,215,742 B2
(45) Date of Patent: Jan. 4, 2022

(54) HEAT-RAY SHIELDING FILM, HEAT-RAY SHIELDING TRANSPARENT LAMINATED BASE MATERIAL, AND AUTOMOBILE MOUNTED WITH THE HEAT-RAY SHIELDING TRANSPARENT LAMINATED BASE MATERIAL AS WINDOW MATERIAL, AND BUILDING USING THE HEAT-RAY SHIELDING TRANSPARENT LAMINATED BASE MATERIAL AS WINDOW MATERIAL

(71) Applicant: SUMITOMO METAL MINING CO., LTD., Tokyo (JP)

(72) Inventors: Kenichi Fujita, Ichikawa (JP); Keisuke Machida, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/839,477

(22) Filed: Apr. 3, 2020

(65) Prior Publication Data

US 2020/0233129 A1 Jul. 23, 2020

Related U.S. Application Data

(63) Continuation of application No. 14/362,303, filed as application No. PCT/JP2012/080191 on Nov. 21, 2012, now abandoned.

(30) Foreign Application Priority Data

Dec. 2, 2011 (JP) .............................. JP2011-265339
Mar. 28, 2012 (JP) .............................. JP2012-072998

(51) Int. Cl.
| | | |
|---|---|---|
| *G02B 5/20* | (2006.01) | |
| *B32B 27/30* | (2006.01) | |
| *B32B 27/22* | (2006.01) | |
| *B32B 17/10* | (2006.01) | |
| *G02B 1/04* | (2006.01) | |
| *B60J 3/00* | (2006.01) | |

(52) U.S. Cl.
CPC ........ *G02B 5/208* (2013.01); *B32B 17/10036* (2013.01); *B32B 17/10633* (2013.01); *B32B 17/10761* (2013.01); *B32B 27/22* (2013.01); *B32B 27/30* (2013.01); *B60J 3/007* (2013.01); *G02B 1/04* (2013.01); *B32B 2307/3065* (2013.01); *B32B 2307/412* (2013.01); *B32B 2307/712* (2013.01); *B32B 2419/00* (2013.01); *B32B 2605/006* (2013.01); *Y10T 428/3163* (2015.04); *Y10T 428/31855* (2015.04)

(58) Field of Classification Search
None
See application file for complete search history.

(56) References Cited

U.S. PATENT DOCUMENTS

| | | | |
|---|---|---|---|
| 8,853,314 B2 | 10/2014 | Mamak et al. | |
| 2004/0234778 A1 | 11/2004 | Fukatani et al. | |
| 2006/0154049 A1 | 7/2006 | Padiyath et al. | |
| 2008/0075936 A1 | 3/2008 | McGurran et al. | |
| 2009/0116100 A1 | 5/2009 | Ota et al. | |
| 2009/0136730 A1 | 5/2009 | Nakano et al. | |
| 2009/0162671 A1 | 6/2009 | Marumoto | |
| 2010/0140533 A1 | 6/2010 | Fujita | |
| 2010/0220388 A1* | 9/2010 | Suzuki ................... G02B 5/208 359/359 |
| 2014/0106175 A1* | 4/2014 | Fujita ................ B32B 17/10633 428/432 |

FOREIGN PATENT DOCUMENTS

| | | |
|---|---|---|
| EP | 2 484 649 A1 | 8/2012 |
| JP | H04-160041 A | 6/1992 |
| JP | H08-217500 A | 8/1996 |
| JP | H08-259279 A | 10/1996 |
| JP | H10-297945 A | 11/1998 |
| JP | 2001-89202 A | 4/2001 |
| JP | 2002-220262 A | 8/2002 |
| JP | 2004-37768 A | 2/2004 |
| JP | 2007-045636 A | 2/2007 |
| JP | 2008-528313 A | 7/2008 |
| JP | 2008-194563 A | 8/2008 |
| JP | 2008-200924 A | 9/2008 |
| JP | 2010-202495 A | 9/2010 |
| WO | 2006/074168 A2 | 7/2006 |
| WO | 2010-046285 A2 | 4/2010 |
| WO | 2011/040444 A1 | 4/2011 |
| WO | WO-2012140898 A1 * | 10/2012 ....... B32B 17/10761 |

OTHER PUBLICATIONS

Hatta et al., JP-2007045636-a, Feb. 22, 2007 (Machine translation) (Year: 2007).
Wicks, Z. (2007). Organic coatings: Science and Technology. 3rd ed. Hoboken, N. J: Wiley-Interscience, p. 425.
International Search Report issued in PCT/JP2012/080191 dated Feb. 5, 2013 (with translation).

* cited by examiner

*Primary Examiner* — Cheng Yuan Huang
(74) *Attorney, Agent, or Firm* — Oliff PLC

(57) ABSTRACT

There is provided a heat-ray shielding film mainly composed of polyvinyl acetal resin and capable of exhibiting excellent heat shielding properties, and a heat-ray shielding transparent laminated base material using the heat-ray shielding film, the heat-ray shielding film including: a compound having a heat-ray shielding function; a selective wavelength absorbing material; polyvinyl acetal resin, and a plasticizer; wherein the selective wavelength absorbing material has a transmittance profile in which a transmittance of a light having a wavelength of 550 nm is 90% or more, and a transmittance of a light having a wavelength of 450 nm is 40% or less.

9 Claims, 4 Drawing Sheets

HEAT-RAY SHIELDING FILM, HEAT-RAY SHIELDING TRANSPARENT LAMINATED BASE MATERIAL, AND AUTOMOBILE MOUNTED WITH THE HEAT-RAY SHIELDING TRANSPARENT LAMINATED BASE MATERIAL AS WINDOW MATERIAL, AND BUILDING USING THE HEAT-RAY SHIELDING TRANSPARENT LAMINATED BASE MATERIAL AS WINDOW MATERIAL

This is a Divisional of application Ser. No. 14/362,303 filed Jun. 2, 2014, which is a National Stage Application of PCT/JP2012/080191 filed Nov. 21, 2012, which in turn claims priority to Japanese Application No. 2012-072998 filed Mar. 28, 2012, and Japanese Application No. 2011-265339 filed Dec. 2, 2011. The entire disclosures of the prior applications are hereby incorporated by reference herein their entirety.

TECHNICAL FIELD

The present invention relates to a heat-ray shielding film, a heat-ray shielding transparent laminated base material having satisfactory visible light transmittance and excellent heat-ray shielding function, and an automobile mounted with the heat-ray shielding transparent laminated base material as a window material.

BACKGROUND ART

A transparent base material is used as a safety glass used for a window material of an automobile or a building, etc., in the form of a laminated glass which is constituted by sandwiching an interlayer containing polyvinyl acetal resin, etc., between several (for example two) facing plate glasses Further, the transparent base material is proposed for the purpose of reducing a cooling load or hot feeling by shutting-off an incident solar energy, by having a heat-ray shielding function in the interlayer.

For example, patent document 1 discloses a laminated glass which is constituted by sandwiching a soft resin layer between two facing plate glasses, the soft resin layer containing a heat-ray shielding metal oxide composed of tin oxide or indium oxide having a particle size of 0.1 µm or less.

Further, patent document 2 discloses a laminated glass which is constituted by sandwiching an interlayer between at least two facing plate glasses, so that metals such as Sn, Ti, Si, Zn, Zr, Fe, Al, Cr, Co, Ce, In, Ni, Ag, Cu, Pt, Mn, Ta, W, V, and Mo, oxide of such metals, nitride of such metals, sulfide of such metals, these metals doped with Sb or F, and a composite of them are dispersed in the interlayer.

Also, patent document 3 discloses an automobile window glass which is constituted by sandwiching a mixture layer of particles composed of $TiO_2$, $ZrO_2$, $SnO_2$, $In_2O_3$, and a glass component composed of organic silicon or an organic silicon compound, between facing transparent plate-like members.

Moreover, patent document 4 discloses a laminated glass which is constituted by sandwiching an interlayer composed of three layers between at least two facing transparent glass plate-like bodies. In the second layer of this interlayer, metal such as Sn, Ti, Si, Zn, Zr, Fe, Al, Cr, Co, Ce, In, Ni, Ag, Cu, Pt, Mn, Ta, W, V, and Mo, oxide of such metals, nitride of such metals, sulfide of such metals, these metals doped with Sb or F, or a composite of such materials has been dispersed. The first and the third layers of the interlayer are resin layers.

However, the conventional laminated glass disclosed in patent documents 1 to 4 all involve a problem of an insufficient heat-ray shielding function when high visible light transmittance is requested.

Further, as a method for improving the heat-ray shielding function of laminated glass, patent document 5 discloses an ultraviolet ray and infrared ray shielding body produced by mixing a metal oxide semiconductor, an infrared absorbing agent, and an ultraviolet absorbing agent in a transparent synthetic resin, and forming the mixture into a film.

Meanwhile, in patent document 6, an applicant discloses a heat-ray shielding laminated glass constituted by sandwiching an interlayer having a heat-ray shielding function between two plate glasses, wherein the intermediate layer is constituted of a heat-ray shielding film containing hexaboride particles alone, or, hexaboride particles, ITO particles and/or ATO particles, and a vinyl resin, or a heat-ray shielding laminated glass constituted of a heat-ray shielding film containing the abovementioned particles and having the interlayer formed on a surface facing the inside of at least one of the plate glasses, and a heat-ray shielding film containing vinyl resin sandwiched between the abovementioned two plate glasses.

As described in patent document 6, optical properties of the heat-ray shielding laminated glass are as follows: hexaboride particles alone, or, hexaboride particles, ITO particles and/or ATO particles are used, and there is a maximum point of transmittance in a visible light region, and there is a minimum point of transmittance in a near-infrared region where strong absorbing property is exhibited. As a result, the heat-ray shielding laminated glass of patent document 6 is improved enough to realize 50% range of the solar transmittance when the transmittance of visible light is 70% or more, in comparison with the conventional laminated glasses described in patent documents 1 to 4, Further, the present inventors disclose in patent document 7 a heat-ray shielding laminated glass in which the polyvinyl acetal resin is replaced with a UV-ray curable resin, and a heat-ray shielding film containing a composite tungsten compound in this UV-ray curable resin is used as an interlayer.

As described in patent document 7, the heat-ray shielding laminated glass is improved enough to realize around 35% of the solar transmittance when the transmittance of visible light is 70% or more, in comparison with the conventional laminated glass described in patent documents 1 to 4 and patent document 6.

CITATION LIST

Patent Document

Patent Document 1: Japanese Patent Laid-Open No. 1996-217500
Patent Document 2: Japanese Patent Laid-Open No. 1996-259279
Patent Document 3: Japanese Patent Laid-Open No. 1992-160041
Patent Document 4: Japanese Patent Laid-Open No. 1998-297945
Patent Document 5: Japanese Patent Laid-Open No. 2004-37768
Patent Document 6: Japanese Patent Laid-Open No. 2001-89202

Patent Document 7: Japanese Patent Laid-Open No. 2010-202495

SUMMARY OF INVENTION

Subject to be Solved by the Invention

However, as a result of further investigations by the present inventors, the following subjects are found.

A first subject is that, as described above, the laminated glass of the conventional technology described in patent documents 1 to 5 does not have a sufficient heat-ray shielding function when high visible light transmittance is requested.

Further, in the market, from the viewpoint of improving the comfort in the automobiles or buildings, improving fuel efficiency by reducing a load of the air conditioner in the automobile, and energy-saving by reducing the load of the air conditioner in the buildings, higher performance of the heat-ray shielding function is strongly requested. From these viewpoints, there is still room for improvement in the heat-ray shielding laminated glass described in patent documents 6 and 7.

In view of the abovementioned subject, the present invention is provided. An object of the present invention is to provide a heat-ray shielding film mainly composed of polyvinyl acetal resin and capable of exhibiting excellent heat-ray shielding properties, a heat-ray shielding transparent laminated base material using the heat-ray shielding film, and an automobile mounted with the heat-ray shielding transparent laminated base material as a window material.

Means for Solving the Subject

To solve the abovementioned subjects, the present inventors examine a method for improving heat-ray shielding properties while maintaining high visible light transmittance.

A wavelength distribution of a weight value coefficient is focused by inventors of the present invention, wherein the weight value coefficient is used for calculating the transmittance of a visible light described in JIS R 3106. Specifically, detailed examination is given for the wavelength distribution of the weight value coefficient used for calculating the transmittance of a visible light, and the solar energy in the short wavelength region. Then, it is found by the inventors of the present invention, that only the solar transmittance can be reduced while maintaining high transmittance of a visible light, by suitably shutting-off the short wavelength region of the visible light.

Specifically, the inventors of the present invention are not affected by a common sense of using a conventional UV-ray shielding agent which does not cut a visible light region as much as possible, and achieve a structure of using a material not having absorption in the vicinity of a wavelength of 550 nm which is a region greatly contributing to calculating a transmittance of the visible light while strongly absorbing the light in the vicinity of a wavelength of 450 nm, in combination with a compound having a heat-ray shielding function, so as to prevent reduction of the transmittance of visible light, and so as not to allow a heat-ray shielding transparent laminated base material to be colored in yellow, Namely, in order to solve the abovementioned subject, a first invention provides, a heat-ray shielding film including a compound having a heat-ray shielding function, a selective wavelength absorbing material, a polyvinyl acetal resin, and a plasticizer, wherein the selective wavelength absorbing material has a transmission profile in which a transmittance of a light having a wavelength of 550 nm is 90% or more, and a transmittance of a light having a wavelength of 450 nm is 40% or less, and a weight ratio of the compound having a heat-ray shielding function and the selective wavelength absorbing material (compound having a heat-ray shielding function/selective wavelength absorbing material) is in a range of 99/1 to 70/30.

A second invention provides,
the heat-ray shielding film according to the first invention, wherein composite tungsten oxide particles expressed by a general formula $M_yWO_z$ (wherein M is an element of one kind or more selected from Cs, Rb, K, Tl, In, Ba, Li, Ca, Sr, Fe, Sn, Al, and Cu, satisfying $0.1 \leq y \leq 0.5$, and $2.2 \leq z \leq 3.0$) and having a hexagonal crystal structure, are composed of the compound having the heat-ray shielding function.

A third invention provides,
the heat-ray shielding film according to the second invention, wherein the composite tungsten oxide particles are fine particles having an average particle size of 40 nm or less.

A fourth invention provides,
the heat-ray shielding film according to the first invention, wherein the selective wavelength absorbing material is at least one kind of compounds selected from an isoindoline compound, an isoindolinone compound, a quinoxaline compound, a quinophthalone compound, a condensed diazo compound, a nickel azo compound, and a bismuth vanadate compound.

A fifth invention provides,
the heat-ray shielding film according to the first invention, wherein the selective wavelength absorbing material is at least one kind of compounds selected from a quinophthalone compound and a nickel azo compound.

A sixth invention provides,
the heat-ray shielding film according to any of the first to fifth inventions, wherein the selective wavelength absorbing material has a transmission profile in which a transmittance of a light having a wavelength of 550 nm is 90% or more, and a transmittance of a light having a wavelength of 450 nm is 15% or less.

A seventh invention provides,
the heat-ray shielding film according to any of the first to sixth inventions, wherein the heat-ray shielding film further includes an infrared ray-absorbing organic compound.

An eighth invention provides,
the heat-ray shielding film according to the seventh invention, wherein the infrared ray-absorbing organic compound is at least one kind of compounds selected from a phthalocyanine compound, a naphthalocyanine compound, an immonium compound, a diimmonium compound, a polymethine compound, a diphenylmethane compound, a triphenylmethane compound, a quinone compound, an azo compound, a pentadiene compound, an azomethine compound, a squarylium compound, an organometallic complex, and a cyanine compound.

A ninth invention provides,
the heat-ray shielding film according to the eighth invention, wherein the infrared ray-absorbing organic compound is at least one kind of compounds selected from a phthalocyanine compound and a diimmonium compound.

A tenth invention provides,
the heat-ray shielding film according to any of the seventh to ninth inventions, wherein a weight ratio of the infrared ray-absorbing organic compound and the composite tungsten oxide particles (composite tungsten oxide particles/infrared ray-absorbing organic compound) is in a range of 95/5 to 50/50.

An eleventh invention provides, a heat-ray shielding transparent laminated base material wherein the heat-ray shielding film of any of the first to tenth inventions is arranged between several transparent base materials.

A twelfth invention provides, the heat-ray shielding transparent laminated base material according to the eleventh invention, wherein an infrared ray-reflection film having visible light transmittance of 88% or more and a solar reflectance of 21% or more is further arranged between the plurality of transparent base materials.

A thirteenth invention provides, the heat-ray shielding transparent laminated base material according to either the eleventh or twelfth invention, wherein at least one of the transparent base materials is glass.

A fourteenth invention provides, the heat-ray shielding transparent laminated base material according to any of the eleventh to thirteenth inventions, wherein visible light transmittance calculated based on JIS R 3106 is 70% or more, and solar transmittance is 32.5% or less.

A fifteenth invention provides, an automobile wherein the heat-ray shielding transparent laminated base material according to any of the eleventh to fourteenth inventions is mounted as a window material.

A sixteenth invention provides, a building wherein the heat-ray shielding transparent laminated base material according to any of the eleventh to fourteenth inventions is used as a window material.

Advantage of Invention

According to the present invention, a heat-ray shielding film mainly composed of polyvinyl acetal resin, and capable of exhibiting high optical properties and high weather resistance can be obtained, by using a compound having a heat-ray shielding function together with a selective wavelength absorbing material. Further, a heat-ray shielding transparent laminated base material capable of exhibiting excellent optical properties and excellent mechanical properties can be obtained by using the heat-ray shielding film. Moreover, by mounting the heat-ray shielding transparent laminated base material on an automobile as a window material, temperature rise inside the automobile during summer can be suppressed. Moreover, by using the heat-ray shielding transparent laminated base material as a window material in openings of a building, temperature rise inside the building during summer can be suppressed.

DETAILED DESCRIPTION OF EMBODIMENTS

Figure 1:
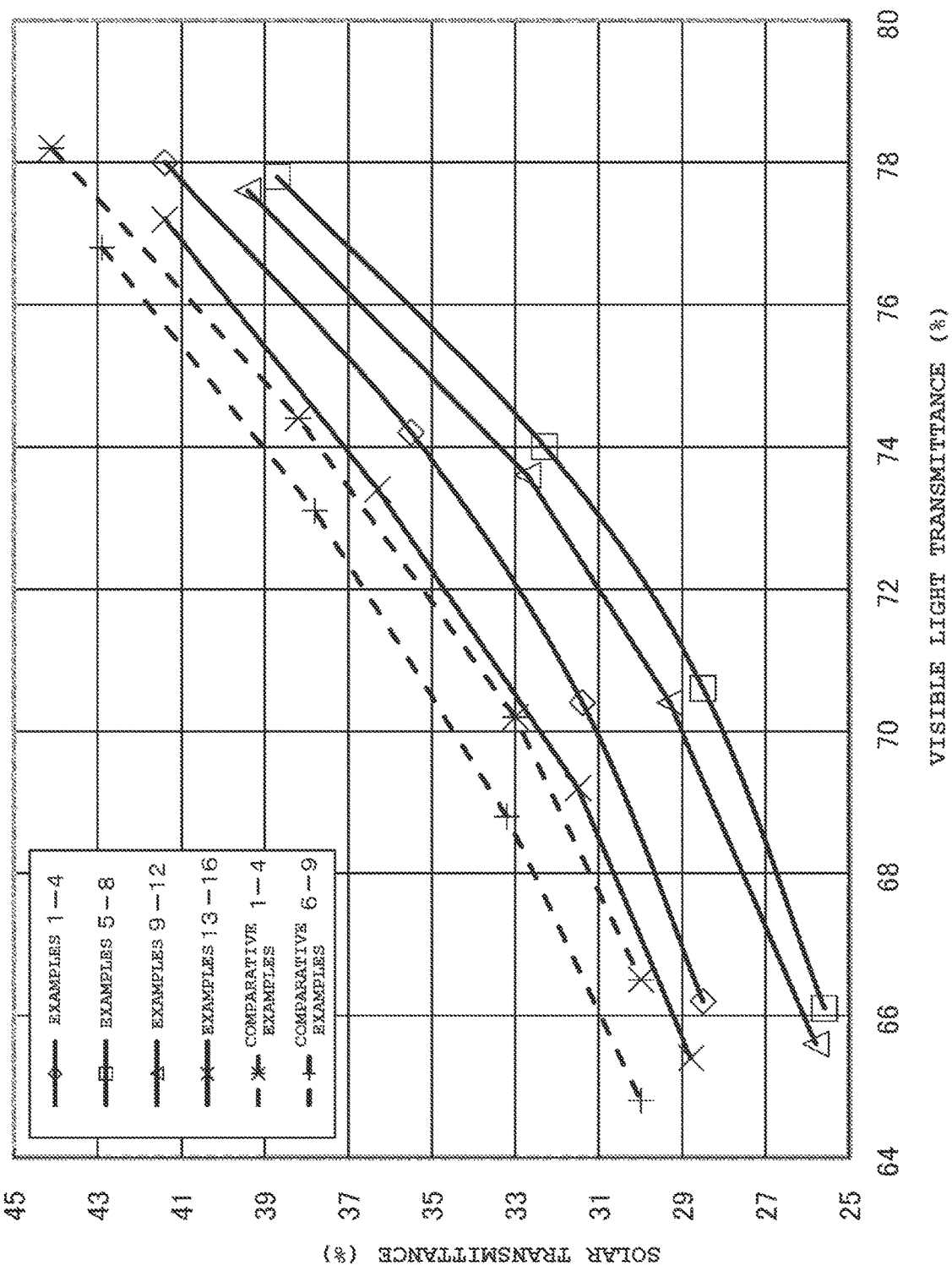
FIG. 1 is a graph showing a relationship between a visible light transmittance and a solar transmittance of a heat-ray shielding transparent laminated base material of examples 1 to 16 and comparative examples 1 to 4 and 6 to 9.

Embodiments of the present invention will be described hereafter in detail.

The heat-ray shielding film of the present invention includes particles of a compound having a heat-ray shielding function, a dispersant, a selective wavelength absorbing material, optionally an infrared ray-absorbing organic compound, a polyvinyl acetal resin, a plasticizer, optionally an adhesive strength regulator, and optionally other additives.

Further, the heat-ray shielding film of the present invention is obtained by dispersing particles of a compound having a heat-ray shielding function and the dispersant in a part of a plasticizer added to the polyvinyl acetal resin to obtain a particle dispersion liquid of a compound having a heat-ray shielding function. The obtained dispersion liquid, the selective wavelength absorbing material, the polyvinyl acetal resin, and the plasticizer are kneaded and thereafter formed into a film by a publicly-known method such as extrusion and calendaring, to thereby produce the heat-ray shielding film of the present invention.

The heat-ray shielding film of the present invention is also obtained by dispersing the particles of a compound having a heat-ray shielding function and the dispersant in a general organic solvent to obtain a dispersion liquid, and removing the organic solvent to obtain a particle dispersion of the compound having the heat-ray shielding function in a state of dispersing the particles of the compound having the heat-ray shielding function in a solid dispersant, and kneading the obtained solid dispersion, the selective wavelength absorbing material, the polyvinyl acetal resin, and the plasticizer, and forming them into a film by a publicly-known method such as extrusion and calendaring.

The constituents of the heat-ray shielding film of the present invention, the heat-ray shielding film, and the heat-ray shielding transparent laminated base material using the heat-ray shielding film will be described hereafter in detail.

Although composite tungsten oxide particles and organic infrared ray-shielding particles, etc., can be used as the particles of a compound having a heat-ray shielding function of the present invention, the composite tungsten oxide particles is preferably used. Therefore explanation is given hereafter for a case that the composite tungsten oxide particles are used as the particles of the compound having the heat-ray shielding function. However, even in a case of using the organic infrared-ray shielding particles, etc., or using the composite tungsten oxide particles together with the organic infrared-ray shielding particles, etc., the heat-ray shielding film and the heat-ray shielding laminated transparent base material can be produced in the same way as the case of using the composite tungsten oxide particles alone.

[1] Constituents of the Heat-Ray Shielding Film

The method for producing fine particles having the heat-ray shielding function, which are a constituent of the heat-ray shielding film of the present invention, and the dispersant, the selective wavelength absorbing material, the infrared ray-absorbing organic compound, the polyvinyl acetal resin, the plasticizer, the adhesive strength regulator, and the other additive materials of the heat-ray shielding film of the present invention will be described first.

(1) Particles Having a Heat-Ray Shielding Function

The composite tungsten oxide particles are given as a preferable example of the particles having the heat-ray shielding function of the present invention. The composite tungsten oxide particles often have a bluish transmission color tone due to great absorption of light having the near-infrared region, particularly having a wavelength of 1,000 nm or more.

Preferably, the composite tungsten oxide particles are expressed by a general formula $M_yWO_z$ wherein M indicates one or more elements selected from Cs, Rb, K, Tl, In, Ba, Li, Ca, Sr, Fe, Sn, Al, and Cu, satisfying $0.1 \leq y \leq 0.5$, and $2.2 \leq z \leq 3.0$, and have a hexagonal crystal structure.

In the abovementioned composite tungsten oxide particles, $Cs_{0.33}WO_3$, $Rb_{0.33}WO_3$, $K_{0.33}WO_3$, and $Ba_{0.33}WO_3$ are given as preferable examples of the composite tungsten oxide particles. If the values of y and z are within the abovementioned range, effective heat-ray shielding properties can be obtained. The addition amount of the additive element M is preferably 0.1 or more and 0.5 or less, and more preferably is in the vicinity of 0.33. This is because a theoretical value calculated from the hexagonal crystal structure is 0.33, and a preferable optical property can be obtained when the addition amount is around 0.33. Further, Z is preferably in a range of $2.2 \leq z \leq 3.0$. This is because the same mechanism as the mechanism of the tungsten oxide material expressed by $WO_z$ works for the composite tungsten oxide material expressed by $M_yWO_z$, and because free electrons are supplied by adding the element M in the range of $z \leq 3.0$, which is more preferably $2.45 \leq z \leq 3.00$ from a viewpoint of the optical property.

The particle size of the composite tungsten oxide particles can be properly selected according to the purpose of use of the heat-ray shielding film. For example, when the heat-ray shielding film is used for an application requiring transparency, the composite tungsten oxide particles preferably have a dispersed particle size of 40 nm or less. This is because when the composite tungsten oxide particles have a dispersed particle size of 40 nm or less, the light is not completely shielded by scattering, and therefore visibility in the visible light region can be maintained and transparency can be efficiently maintained.

If the heat-ray shielding film or the heat-ray shielding transparent laminated base material of the present invention is used for an application emphasizing transparency particularly in the visible light region, like an automobile windshield for example, it is further preferable to consider reduction of scattering caused by the composite tungsten oxide particles. When such a further reducing of scattering is taken into consideration, the dispersed particle size of the composite tungsten oxide particles is 30 nm or less, and preferably 25 nm or less.

This is because the scattering of light in the visible light region in a wavelength of 400 nm to 780 nm, caused by geometric scattering or Mie scattering, is reduced if the dispersed particle size of the composite tungsten oxide particles is small. By reducing the scattering of light having this wavelength, the following situation can be prevented: the heat-ray shielding film has an appearance like opaque glass when irradiated with strong light, thereby losing clear transparency.

This is because if the dispersed particle size of the composite tungsten oxide particles is 40 nm or less, the abovementioned geometric scattering or Mie scattering is reduced, and a scattering mechanism becomes the Rayleigh scattering. In a Rayleigh scattering region, scattered light is reduced in inverse proportion to the sixth power of the particle size, and therefore scattering is reduced and transparency is improved with the reduction of dispersed particle size. Further, if the dispersed particle size of the composite tungsten oxide particles is 25 nm or less, scattered light is extremely reduced, and this is preferable.

Therefore, as described above, from the viewpoint of avoiding scattering of light, the dispersed particle size of the composite tungsten oxide particles is preferably small. Meanwhile, if the dispersed particle size of the composite tungsten oxide particles is 1 nm or more, industrial production is facilitated.

Further, the amount of composite tungsten particles included in the heat-ray shielding film is desirably 0.2 $g/m^2$ to 2.5 $g/m^2$ per unit area.

(2) Method for Producing Fine Particles Having the Heat-Ray Shielding Function

The composite tungsten oxide particles expressed by the general formula $M_yWO_z$, can be obtained by applying heat treatment to a tungsten compound starting material in an inert gas or a reducing gas atmosphere.

The tungsten compound starting material will be described first.

The tungsten compound starting material is preferably at least one kind or more selected from tungsten trioxide powder, tungsten dioxide powder, tungsten oxide hydrate powder, tungsten hexachloride powder, ammonium tungstate powder, or tungsten oxide hydrate powder obtained by dissolving tungsten hexachloride powder in alcohol and thereafter drying them, or tungsten oxide hydrate powder obtained by dissolving tungsten hexachloride in alcohol and thereafter adding water to thereby precipitate the tungsten hexachloride and drying them, or a tungsten compound powder obtained by drying an aqueous solution of ammonium tungstate, and metal tungsten powder, and further preferably a tungsten compound containing element M in a form of the element alone or a compound, is used as the stating material.

To produce a starting material in which each component is uniformly mixed at a molecular level, each source is preferably mixed in a form of a solution, and the tungsten compound starting material containing element M is preferably solvable in a solvent such as water or an organic solvent. For example, element M-containing tungstate, chloride salt, nitrate, sulfate, oxalate, oxide, carbonate, and hydroxide can be used. However, the tungsten compound starting material is not limited thereto, and a material in a solution state is also preferable.

Next, the heat treatment in an inert gas atmosphere or a reducing gas atmosphere will be described. First, as the heat treatment condition in an inert gas atmosphere, 400° C. or more is preferable. A starting material subjected to heat treatment at 400° C. or more has sufficient near-infrared absorption and good efficiency as heat-ray shielding particles. As the inert gas, an inert gas such as Ar and $N_2$ may be used.

Further, as the condition of the heat treatment under a reducing atmosphere, first, heat treatment is applied to the starting material at 100° C. or more and 400° C. or less in a reducing gas atmosphere, and subsequently heat treatment is applied thereto at a temperature of 400° C. or more and 1,200° C. or less in an inert gas atmosphere. The reducing gas at this point is not particularly limited, however, $H_2$ is preferable. When using $H_2$ as the reducing gas, the composition of the reducing atmosphere is mixed so that, for example, 0.1% or more by volume of $H_2$ is mixed in an inert gas such as Ar and $N_2$, and more preferably 0.2% or more is mixed. If $H_2$ is mixed by 0.1% or more by volume, reduction can be efficiently promoted.

From the viewpoint of improving weather resistance, preferably, surface treatment is applied to the composite tungsten oxide particles of the present invention, with each particle coated with a compound containing one kind or more element selected from Si, Ti, Zr, and Al, and preferably an oxide. A publicly-known surface treatment may be performed as the surface treatment, using an organic compound containing one kind or more elements selected from Si, Ti, Zr, and Al. For example, the composite tungsten oxide particles of the present invention and an organic silicon compound may be mixed, and subjected to hydrolysis.

Further, from the viewpoint of improving the optical properties of the heat-ray shielding film described later, it is preferable that the powder color of the composite tungsten oxide particles satisfy the conditions recommended by the International Commission on Illumination (CIE), so that L* is 25 to 80, a* is −10 to 10, and b* is −15 to 15 in a powder color of the L*a*b* color system (JIS Z8729-2004). By using the composite tungsten oxide particles having such a powder color, the heat-ray shielding film having excellent optical properties can be obtained.

(3) Dispersant

The dispersant of the present invention is used for uniformly dispersing the abovementioned composite tungsten oxide particles of the present invention in a polyvinyl acetal resin described later.

The dispersant having a thermal decomposition temperature of 200° C. or more measured by a simultaneous thermogravimetry and differential thermal analysis measurement apparatus (described as "TG-DTA" hereafter in some cases), and having urethane, acrylic, and styrene main chains, is preferably used as the dispersant of the present invention. Here, the thermal decomposition temperature is the temperature obtained by TG-DTA measurement, at which weight reduction starts by the thermal decomposition of the dispersant.

This is because if the thermal decomposition temperature is 200° C. or more, the dispersant is not decomposed when the dispersant is kneaded into the polyvinyl acetal resin. Thus, the following situation caused by the decomposition of the dispersant can be prevented: the heat-ray shielding film for heat-ray shielding laminated glass is colored in brown, visible light transmittance is deteriorated, and original optical properties cannot be obtained.

Further, the dispersant having an amine-containing group, a hydroxyl group, a carboxyl group, or an epoxy group, as functional groups, is preferably used as the abovementioned dispersant. These functional groups have an effect of adsorbing on the surface of the composite tungsten oxide particles, thereby preventing an aggregation of the composite tungsten oxide particles, and uniformly dispersing the particles even in the heat-ray shielding film. Specifically, the dispersant includes an acrylic/styrene copolymer dispersant having a carboxyl group as a functional group, and an acrylic dispersant having an amine-containing group as a functional group. The dispersant having an amine-containing group as a functional group having a molecular weight Mw of 2,000 to 200,000 and an amine value of 5 to 100 mg KOH/g, is preferably used as the dispersant having the amine-containing group as the functional group. Further, the dispersant having a molecular weight Mw of 2,000 to 200,000 and an acid value of 1 to 50 mg KOH/g is preferably used as the dispersant having the carboxyl group.

The addition amount of the dispersant is preferably in a range of 10 pts.wt. to 1000 pts.wt. and more preferably 30 pts.wt. to 400 pts.wt. with respect to 100 pts.wt. of the composite tungsten oxide particles. This is because if the addition amount of the dispersant is in this range, the composite tungsten oxide particles can be uniformly dispersed in the polyvinyl acetal resin, and there is no adverse impact on the physical properties of the obtained heat-ray shielding film.

(4) Selective Wavelength Absorbing Material

The selective wavelength absorbing material of the present invention is the material capable of selectively and strongly absorbing only light having a specific wavelength region.

As described above, in consideration of a wavelength distribution of a weight value coefficient used for calculating a visible light transmittance described in JIS R 3106, the inventors achieves a mechanism as follows: a selective wavelength absorbing material is used together with the composite tungsten oxide particles, wherein the selective wavelength absorbing material is the material of strongly absorbing a light having the wavelength of 450 nm which is not completely shielded only by the composite tungsten oxide particles, and not absorbing the light having the wavelength of 550 nm or around which is a wavelength region greatly contributing to calculating the visible light transmittance. Further, by using the selective wavelength absorbing material that strongly absorbs the light having a wavelength of around 450 nm but does not absorb the light having a wavelength of around 550 nm, together with composite tungsten oxide particles, lower solar transmittance can be obtained than a case of using the composite tungsten oxide particles alone.

Further, in a case of using a heat-ray shielding transparent laminated base material as a member whose high visibility is requested like an automobile windshield, when the heat-ray shielding transparent laminated base material is irradiated with strong light such as direct sunlight or headlight, the visible light having a short wavelength region is strongly scattered by the contained particles such as the composite tungsten oxide particles, and there is a phenomenon that the heat-ray shielding transparent laminated base material is clouded in pale color in some cases, and this is a problem.

Here, inventors of the present invention achieve an effect of increasing transparency of the heat-ray shielding film and the heat-ray shielding transparent laminated base material of the present invention, by suppressing a generation of bluish clouding by absorbing the scattered light of the visible light having the short wavelength region by the selective wavelength absorbing material, wherein such a light having the short wavelength region is generated by scattering of the composite tungsten oxide particles, etc.

As the optical properties of the selective wavelength absorbing material of the present invention, preferably, the transmittance of the selective wavelength absorbing material itself excluding absorption of the light by a medium or the base material, is 90% or more for the light having the wavelength of 550 nm, and the transmittance for the light having the wavelength of 450 nm is 40% or less. More preferably, the transmittance for the light having the wavelength of 550 nm is 90% or more, and the transmittance for the light having the wavelength of 450 nm is 15% or less.

This is because if the light transmittance of the selective wavelength absorbing material is 90% or more for the light having the wavelength of 550 nm, and is 40% or less for the light having the wavelength of 450 nm, the visible light transmittance is not reduced when the selective wavelength absorbing material is used together with the composite tungsten oxide particles, and further the absorption of the light having the wavelength of 450 nm or around can also be sufficiently obtained. As a result, the solar transmittance becomes low and heat shielding properties are improved, compared with a case of using the composite tungsten oxide particles alone.

Specific examples of the selective wavelength absorbing material used in the present invention include isoindoline compounds, isoindolinone compounds, quinoxaline compounds, quinophthalone compounds, condensed diazo compounds, nickel azo compounds, and bismuth vanadate compounds.

In order to obtain the transmittance of 15% or less for the light having the wavelength of 450 nm, at least one kind of a compound selected from quinophthalene compound and a nickel azo compound is preferably used.

A mixing ratio of the selective wavelength absorbing material and the composite tungsten oxide particles is preferably set so that a weight ratio (composite tungsten oxide particles/selective wavelength absorbing material) value is in a range of 99/1 to 70/30, preferably 95/5 to 80/20, and more preferably 90/10 to 80/20. When the ratio of mixing the addition amount of the selective wavelength absorbing material is 70/30 or less, the light having the visible light region is not strongly absorbed by the selective wavelength absorbing material, and the transmittance for the visible light is maintained. This is because the solar transmittance is maintained and the shielding property is maintained as a result, compared with a case of using the composite tungsten oxide particles alone.

When the weight ratio of mixing the addition amount of the selective wavelength absorbing material is 99/1 or more, the light having the wavelength of 450 nm or around can be sufficiently absorbed. Thus, there is an effect of adding the selective wavelength absorbing material.

The method for adding the selective wavelength absorbing material to the heat-ray shielding film can be carried out by adding the compound itself to composite tungsten oxide particle plasticizer dispersion liquid described later, or adding to the polyvinyl acetal resin and the plasticizer together with the composite tungsten oxide particle dispersion.

However, when the transparency of the obtained heat-ray shielding film or the heat-ray shielding transparent laminated base material using the heat-ray shielding film is taken into consideration, similarly to the abovementioned composite tungsten oxide particles, the selective wavelength absorbing material can be added to the heat-ray shielding film as a dispersion liquid with the selective wavelength absorbing material dispersed in the plasticizer, or as a dispersion with the selective wavelength absorbing material dispersed in a solid dispersant.

In any case, in order to uniformly disperse the selective wavelength absorbing material in the heat-ray shielding film, a method not damaging the transparency of the obtained heat-ray shielding film can be suitably used.

(5) Infrared Ray-Absorbing Organic Compound

In the present invention, an infrared ray-absorbing organic compound having a strong absorption in a near-infrared region may be further added as needed, to the heat-ray shielding film.

As the infrared ray-absorbing organic compounds used for this purpose, phthalocyanine compounds, naphthalocyanine compounds, immonium compounds, diimmonium compounds, polymethine compounds, diphenylmethane compounds, triphenylmethane compounds, quinone compounds, azo compounds, pentadiene compounds, azomethine compounds, squarylium compounds, organometallic complexes, and cyanine compounds, can be used.

The infrared ray-absorbing organic compound solvable in the plasticizer constituting the heat-ray shielding film, is preferably selected, because the transparency of the obtained heat-ray shielding film is not damaged.

A material that strongly absorbs the light having a visible light long wavelength region to a near infrared region, namely 650 nm to 1000 nm, is more preferably used as the infrared ray-absorbing organic compound. This is because there is a large synergistic effect when an infrared ray-absorbing organic compound having such optical properties is used together with the composite tungsten oxide particles having a strong absorption in the wavelength region of 800 nm or more, and higher heat shielding properties can be obtained compared with a case of using the composite tungsten oxide particles alone.

From the above viewpoint, a diimmonium compound or a phthalocyanine compound is particularly preferable as the infrared ray-absorbing organic compound used in the present invention.

The weight ratio of the infrared ray-absorbing organic compound and the composite tungsten oxide particles is preferably set to satisfy: (composite tungsten oxide particles/infrared ray-absorbing organic compound)=95/5 to 50/50.

If the weight ratio of mixing the addition amount of the infrared ray-absorbing organic compound is smaller than 95/5, the effect of the infrared ray-absorbing organic compound is reduced, which is the effect of strongly absorbing the light having the visible light long wavelength region to the near infrared region 650 nm to 1000 nm. Thus, there is no effect of adding the infrared ray-absorbing organic compound. This is not preferable. Further, if the weight ratio of mixing the addition amount of the infrared ray-absorbing organic compound is larger than 50/50, the light having the wavelength of 550 nm or around which is the wavelength region greatly contributing to calculating the visible light transmittance is also absorbed by the infrared ray-absorbing organic compound, resulting in reducing the visible light transmittance. Therefore, if the reduction of the visible light transmittance is also taken into consideration, the heat shielding property is deteriorated. This is not preferable.

(6) Polyvinyl Acetal Resin

As the polyvinyl acetal resin used in the heat-ray shielding film of the present invention, polyvinyl butyral resin is preferable. Further, in consideration of the physical properties of the heat-ray shielding film, a plurality of kinds of polyvinyl acetal resins having different degrees of acetalization may be used together. Further, co-polyvinyl acetal resin may also be used, which is obtained by causing a reaction between a plurality of kinds of aldehydes during acetallization.

From this viewpoint, a preferable lower limit of the degree of acetalization of the polyvinyl acetal resin is 60%, and an upper limit thereof is 75%.

The abovementioned polyvinyl acetal resin can be prepared by acetalizing the polyvinyl alcohol by the aldehyde.

As the abovementioned polyvinyl alcohol is usually obtained by saponifying polyvinyl acetate, and generally the polyvinyl alcohol having a degree of saponification of 80 to 99.8 mol % is used.

Further, a lower limit for the degree of polymerization of the polyvinyl alcohol is preferably 200, and an upper limit thereof is preferably 3,000. When the degree of polymerization is 200 or more, resistance to penetration through the produced heat-ray shielding transparent laminated base material is maintained, and safety is maintained. Meanwhile, when the degree of polymerization is 3,000 or less, moldability of the resin film is maintained, the rigidity of the resin film is also maintained in a preferable range, and processability is maintained.

The abovementioned aldehyde is not particularly limited. Generally, 1-10C aldehyde is used, such as n-butyl aldehyde, iso-butyl aldehyde, 2-ethylbutyl aldehyde, n-hexyl aldehyde, n-octyl aldehyde, and acetaldehyde. Above all, n-butyl aldehyde, n-hexyl aldehyde, and n-valeraldehyde are preferable, and 4C butyl aldehyde is more preferable.

(7) Plasticizer

As the plasticizer used for the heat-ray shielding film mainly composed of the polyvinyl acetal resin of the present invention, plasticizer as a compound of monohydric alcohol and organic ester, ester plasticizer such as a polyhydric alcohol ester compound, and phosphoric acid plasticizer such as an organic phosphoric acid plasticizer, can be used. Any one of the plasticizers is preferably in a liquid state at room temperature. Particularly, the plasticizer as an ester compound synthesized from a polyhydric alcohol and a fatty acid, is preferable.

Although the ester compound synthesized from the polyhydric alcohol and the fatty acid is not particularly limited, for example, a glycol ester compound is given, which is obtained by a reaction between glycol such as triethylene glycol, tetraethylene glycol, and tripropylene glycol, and monobasic organic acid such as butyric acid, isobutyric acid, caproic acid, 2-ethylbutyric acid, heptylic acid, n-octylic acid, 2-ethylhexylic acid, pelargonic acid (n-nonylic acid), and decylic acid. An ester compound is also given as the compound of tetraethylene glycol, tripropylene glycol, and the abovementioned monobasic organic acid.

Above all, fatty acid ester of triethylene glycol such as triethylene glycol dihexanate, triethylene glycol di-2-ethylbutyrate, triethylene glycol dioctanoate, and triethylene glycol di-2-ethylhexanoate, is preferable. The fatty acid ester of triethylene glycol has a good balance among various qualities, such as compatibility with the polyvinyl acetal and cold resistance, and is excellent in processability and economic efficiency.

When selecting the plasticizer, it should be noted that the plasticizer having low hydrolyzability should be selected. From this viewpoint, triethylene glycol di-2-ethylhexanate, triethylene glycol di-2-ethylbutyrate, and tetraethylene glycol di-2-ethylhexanate are preferable.

(8) Adhesive Strength Regulator

An adhesive strength regulator is preferably contained in the heat-ray shielding film of the present invention as needed.

Although the adhesive strength regulator is not particularly limited, alkali metal salt and/or alkaline earth metal salt is suitably used. Acid constituting such a metal salt is not particularly limited, and for example, carboxylic acid such as octylic acid, hexylic acid, butyric acid, acetic acid, and formic acid, or an inorganic acid such as hydrochloric acid and nitric acid, can be given. In the alkali metal salt and/or alkaline earth metal salt, 2-16C magnesium carboxylate and a 2-16C potassium carboxylate are preferable.

Although the magnesium carboxylate or potassium carboxylate of 2-16C organic acid are not particularly limited, for example, magnesium acetate, potassium acetate, magnesium propionate, potassium propionate, magnesium 2-ethylbutanoate, potassium 2-ethylbutanoate, magnesium 2-ethylhexanoate, and potassium 2-ethylhexanoate, are suitably used.

These adhesive strength regulators can be used alone or two kinds or more of them may be used together.

Further, when a sodium, potassium, magnesium, calcium, or cerium carboxylates are used as adhesive strength regulators, both an original action of the adhesive strength regulator and the effect of improving the weather resistance of the composite tungsten oxide particles can be exhibited.

(9) Other Additives

Further, a generally-used additive can be mixed into the heat-ray shielding film of the present invention as needed. For example, dye compounds and pigment compounds generally used for thermoplastic resin coloring, such as azo dyes, cyanine dyes, quinoline and perylene dyes, and carbon black, may be added to give an arbitrary color tone to the heat-ray shielding film as needed. Particularly, in the present invention, a short wavelength side visible light is absorbed. Therefore, the color of the transmission light becomes yellowish.

Accordingly, the color tone of the heat-ray shielding film is preferably adjusted by adding a compound such as a dye or a pigment.

Further, the selective wavelength absorbing material may have higher transmittance in an ultraviolet region. Therefore, higher heat-ray shielding effect can be obtained by using the selective wavelength absorbing material together with a UV-ray shielding agent. As the UV-ray shielding agent, organic UV-ray absorbing agents such as hydroxy benzophenone, salicylic acid, HALS, triazole, and triazine type absorbing agents, and inorganic UV-ray absorbing agents such as zinc oxide, titanium oxide, and cerium oxide, can be used.

Further, as other additives, a coupling agent, a surfactant, an antistatic agent, etc., can be used.

[2] Heat-Ray Shielding Film

To produce the heat-ray shielding film of the present invention, the abovementioned composite tungsten oxide particles and dispersant are dispersed in a part of the plasticizer added to the polyvinyl acetal resin to produce a composite tungsten oxide particle dispersion liquid, or the composite tungsten oxide particles and the dispersant are dispersed in a general organic solvent to obtain a dispersion liquid, and the organic solvent is then removed to produce composite tungsten oxide particle dispersion with composite tungsten oxide particles dispersed in a solid dispersant.

The heat-ray shielding film can also be produced by mixing and kneading the produced composite tungsten oxide particle plasticizer dispersion liquid or the produced composite tungsten oxide particle dispersion, the selective wavelength absorbing material, the polyvinyl acetal resin, the plasticizer, other additives, and the adhesive strength regulator as needed, and then, for example, forming the mixture into a film by a publicly-known method such as extrusion and calendering. Further, higher heat-ray shielding properties can be obtained by adding an infrared ray-absorbing organic compound to this heat-ray shielding film as needed.

The method for producing the composite tungsten oxide particle plasticizer dispersion liquid, and the method for producing the composite tungsten oxide particle dispersion, will be described hereafter.

(1) Method for Producing Composite Tungsten Oxide Particle Plasticizer Dispersion Liquid The composite tungsten oxide particle plasticizer dispersion liquid can be obtained by adding and mixing the composite tungsten oxide particles and the dispersant to the plasticizer, using a general dispersion method. Specifically, the dispersion method such as bead milling, ball milling, sand milling, and ultrasonic wave dispersion can be used.

When dispersing the composite tungsten oxide particles in the plasticizer, an organic solvent having a boiling point of 120° C. or less may be further added as needed.

The organic solvent having a boiling point of 120° C. or less is preferably used. This is because if the boiling point is 120° C. or less, the organic solvent can be easily removed in the drying step which is the step performed later, and particularly by drying under a decompression state. As a result, the organic solvent is speedily removed in such a decompression drying, which contributes to productivity of the composite tungsten oxide particle-containing composition. Further, since the decompression drying step is easily and sufficiently performed, excessive remaining of the organic solvent in the composite tungsten oxide particle-containing composition of the present invention, can be prevented. As a result, problems such as the occurrence of air bubbles can be avoided in forming the heat-ray shielding film. Specifically, toluene, methyl ethyl ketone, methyl isobutyl ketone, butyl acetate, isopropyl alcohol, and ethanol, can be used. However, if the boiling point is 120° C. or less and the composite tungsten oxide particles can be uniformly dispersed, the organic solvent can be arbitrarily selected.

The method for uniformly dispersing the composite tungsten oxide particles in the organic solvent can be arbitrarily selected from general methods. Specifically, methods such as bead milling, ball milling, sand milling, and ultrasonic wave dispersion can be used.

Further, as a method for removing the organic solvent from the dispersion liquid containing the composite tungsten oxide particles, a decompression drying method is preferable. Specifically, the dispersion liquid containing the composite tungsten oxide particles is decompression-dried while stirring, to thereby separate the composite tungsten oxide particle-containing composition and the organic solvent component. As an apparatus used for the decompression-drying, a vacuum tumbling dryer is used. However, the apparatus is not particularly limited, as long as the apparatus has the abovementioned function. Further, a decompression pressure in the drying step is suitably selected.

By using the decompression method, an efficiency of removing the solvent is improved, and the composite tungsten oxide particle-containing composition is not exposed to a high temperature for a long period. Therefore, preferably, the aggregation of dispersed particles does not occur. Further, productivity is increased, and an evaporated organic solvent can be easily recovered, which is preferable from environmental consideration.

(2) Method for Producing Composite Tungsten Oxide Particle Dispersion

The plasticizer dispersion liquid of the composite tungsten oxide particles, or the composite tungsten oxide particles, the dispersant, and the plasticizer are added and mixed into the organic solvent having the boiling point of 120° C. or less, to thereby produce the composite tungsten oxide particle dispersion in which concentration of the heat-ray shielding tungsten oxide particles is 50 mass % or less, using the general dispersion method.

The concentration of the composite tungsten oxide particles in the plasticizer is preferably 50 mass % or less. This is because if the concentration of the composite tungsten oxide particles in the plasticizer is 50 mass % or less, the aggregation of the particles hardly occurs, dispersion is facilitated, sudden increase of viscosity can be prevented, and handling is easy.

The method for uniformly dispersing the composite tungsten oxide particles in the plasticizer can be arbitrarily selected from general methods. As a specific example, the composite tungsten oxide particles-containing dispersion liquid is obtained, then, the organic solvent is removed by a publicly-known method, to thereby obtain the composite tungsten oxide particles dispersion, with the composite tungsten oxide particles dispersed in a solid dispersant.

[3] Heat-Ray Shielding Transparent Laminated Base Material

The heat-ray shielding transparent laminated base material having the heat-ray shielding film of the present invention, has various forms.

For example, a heat-ray shielding laminated inorganic glass using inorganic glass as the transparent base material, can be obtained by integrally laminating several inorganic glasses by a publicly-known method, wherein the inorganic glasses are faced each other, with the heat-ray shielding film of the present invention sandwiched between them.

The obtained heat-ray shielding laminated inorganic glass can be mainly used as inorganic glass for an automobile windshield or a building window.

It is also preferable that the heat-ray shielding film of the present invention and an infrared-ray reflection film described later are used together, to thereby constitute the heat-ray shielding transparent laminated base material. In this structure, the infrared ray-reflection film is sandwiched between the heat-ray shielding film and a transparent PVB resin film to thereby integrally form a multilayer film. The obtained multilayer film is sandwiched between several facing inorganic glasses, and they are integrally laminated by a publicly-known method to thereby obtain the heat-ray shielding laminated inorganic glass.

Here, in view of the use of the heat-ray shielding laminated inorganic glass for an automobile, the infrared-ray reflection film is preferably disposed at more outside the vehicle than the heat-ray shielding film of the present invention, in consideration of the effect of suppressing a temperature rise in the automobile.

The heat shielding property of the heat-ray shielding transparent laminated base material of the present invention is expressed by the solar transmittance with respect to the visible light transmittance. As the solar transmittance becomes lower than the visible light transmittance, the heat-ray shielding transparent laminated base material has an excellent heat-ray shielding property. Specifically, when the visible light transmittance is 70%, the solar transmittance is preferably 32.5% or less, more preferably 31% or less, and further more preferably 30% or less.

This is because, especially if the heat-ray shielding transparent laminated base material of the present invention is used for a window material such as the windshield of an automobile, a high heat-ray shielding power is required while satisfying the transmittance of 70% or more as defined by the Road Trucking Vehicle Act. If the solar transmittance of the heat-ray shielding transparent laminated base material is 32.5% or less, the power consumption of an air conditioner at 30° C. or more outside temperature is reduced by 5% or more compared with a case of a normal vehicle-mounted laminated glass. As a result, particularly in an automobile using a battery like a hybrid car or an electric automobile, battery consumption can be suppressed, and therefore a significant effect useful for extending a cruising distance, etc., can be obtained. Accordingly, automobile fuel efficiency is improved, thus contributing to reduction of a greenhouse gas emission. Therefore, the heat-ray shielding transparent laminated base material of the present invention is expected as a future essential member in designing an automobile.

The heat-ray shielding transparent laminated base material can also be obtained by using a transparent resin as the transparent base material which is used similarly to the inorganic glass or used together with the inorganic glass, with the heat-ray shielding film sandwiched between facing transparent base materials. The purpose of use of the heat-ray shielding transparent laminated base material is the same as the heat-ray shielding laminated inorganic glass.

Further, of course, as needed, the heat-ray shielding film of the present invention can be used alone, or can be used by disposing it on one or both surfaces of the transparent base material such as inorganic glass or transparent resin, etc.

The infrared-ray reflection film used together with the heat-ray shielding film of the present invention will be described hereafter.

The infrared-ray reflection film of the present invention has almost no absorption of a solar light in the visible light region, in consideration of its optical property in the case of being used together with the heat-ray shielding film of the present invention, and preferably reflects lights in a near-infrared region, specifically only in a range of wavelengths 800 nm to 1200 nm, from a viewpoint of a heat-ray shielding function.

Specifically, as the optical properties of the infrared ray film, preferably the visible light transmittance is 85% or more and the solar reflectance is 18% or more, and more preferably the visible light transmittance is 88% or more and the solar reflectance is 21% or more.

Further, the infrared-ray reflection film of the present invention capable of transmitting an electromagnetic wave in a wavelength range of cellular phones and etc., is preferable in consideration of using the heat-ray shielding transparent laminated base material as an automobile windshield or a building window reflection film. Accordingly, a multi resin layer-attached film transmitting the electromagnetic waves is more preferable than a conductive metal layer-attached film not transmitting the electromagnetic wave.

[4] Conclusion

As described above in detail, the heat-ray shielding film of the present invention can be produced by kneading the plasticizer dispersion liquid of the composite tungsten oxide of the present invention, or the composite tungsten oxide solid dispersion of the present invention, the selective wavelength absorbing material, the polyvinyl acetal resin, and the plasticizer, and forming the mixture into a film by a publicly-known method.

Further, the heat-ray shielding transparent laminated base material of the present invention capable of maintaining high transmissivity in the visible light region and exhibiting low solar transmittance can be produced by disposing the heat-ray shielding film of the present invention so as to be sandwiched between facing several transparent base materials.

Further, by using the selective wavelength absorbing material having a transmission profile of 90% or more transmittance at wavelength 550 nm, and 40% or less transmittance at wavelength 450 nm, together with the composite tungsten oxide particles in a specific ratio, higher heat-ray shielding property can be exhibited than a case of using the composite tungsten oxide particles alone.

EXAMPLES

The present invention will be described hereafter in more detail with reference to examples. However, the present invention is not limited to the following examples.

Further, the powder color (visual field: 10°, light source: D65) of the composite tungsten oxide particles, the transmittance of a light having a wavelength of 450 nm and the transmittance of a light having a wavelength of 550 nm of the selective wavelength absorbing material plasticizer dispersion liquid, and the visible light transmittance and the solar transmittance of the heat-ray shielding laminated inorganic glass in each example were measured using the spectrophotometer U-4000 produced by Hitachi, Ltd. The solar transmittance is an index indicating a heat-ray shielding performance of the heat-ray shielding transparent laminated base material.

Further, a haze value was measured using the HR-200 of Murakami Color Research Laboratory Co., Ltd., based on JIS K 7105. The haze value is an index indicating the transparency of the heat-ray shielding transparent laminated base material.

Example 1

$H_2WO_4$ 50 g and $Cs(OH)_2$ 18.7 g (Cs/W (molar ratio) =0.33 equivalents) were thoroughly mixed in an agate mortar to obtain a mixed powder. The mixed powder was heated under supply of 5% $H_2$ gas using $N_2$ gas as a carrier, and subjected to reduction treatment at 600° C. for 1 hour, and thereafter sintered for 30 minutes at 800° C. under $N_2$ gas atmosphere, to thereby obtain composite tungsten oxide particles (abbreviated as "particle a" hereafter).

The composition formula of the "particle a" was $Cs_{0.33}WO_3$, and the powder color was expressed by L*: 35.2845, a*: 1.4873, and b*: −5.2114.

20 mass % of "particle a", 10 mass % of an acrylic dispersant (abbreviated as "dispersant a" hereafter), which is an acrylic dispersant having an amine-containing group as a functional group (amine value: 48 mg KOH/g, decomposition temperature: 250° C.), and 70 mass % of triethylene glycol di-2-ethylhexanoate (abbreviated as plasticizer a hereafter) were weighed. They were charged into a paint shaker containing 0.3 mm-0 $ZrO_2$ beads, and subjected to a pulverization and dispersion treatment for 10 hours to thereby obtain a plasticizer dispersion liquid of the composite tungsten oxide particles (abbreviated as particle dispersion liquid A).

Here, the average dispersed particle size of the tungsten oxide particles in the particle dispersion liquid A was measured using a Microtrac particle size analyzer produced by Nikkiso Co., Ltd., and it was found that the average dispersed particle size was 24 nm.

Meanwhile, 20 mass % of a quinophthalone compound produced by BASF SE as a selective wavelength absorbing material, 10 mass % of "dispersant a", and 70 mass % of plasticizer a were weighed. They were charged into a paint shaker containing 0.3 mm-diameter $ZrO_2$ beads, and subjected to a pulverization and dispersion treatment for 3 hours to obtain a selective wavelength absorbing material plasticizer dispersion liquid (abbreviated as selective wavelength absorbing material dispersion liquid α hereafter).

The selective wavelength absorbing material dispersion liquid α was diluted in a predetermined concentration by the plasticizer a, and put in a glass cell, and optical property thereof was measured. It was found that the transmittance of a light having a wavelength of 450 nm was 5.3%, and the transmittance of a light having a wavelength of 550 nm was 92.8%. Further, a base line was measured by putting the plasticizer a alone in the glass cell, before the abovementioned measurement.

Specific amounts of particle dispersion liquid A and selective wavelength absorbing material dispersion liquid α were added to a mixture in which 30 mass % of plasticizer a and 70 mass % of polyvinyl butyral resin were mixed, so that concentration of "particle a" in the mixture was 0.15 mass % and concentration of the selective wavelength absorbing material was 0.0079 mass %, to thereby obtain composition A for producing a heat-ray shielding film. As a result, the weight ratio of the selective wavelength absorbing material and the composite tungsten oxide particles (composite tungsten oxide particles/selective wavelength absorbing material) in the composition A for producing a heat-ray shielding film was 0.15/0.0079=95/5.

The composition A for producing the heat-ray shielding film was kneaded at 200° C. by a twin-screw extruder, and extruded from a T-die by an extrusion calendar roll method, to thereby obtain the heat-ray shielding film of example 1 as a sheet having 0.7 mm thickness.

The obtained heat-ray shielding film of example 1 was sandwiched between two facing inorganic glasses and integrally laminated by a publicly-known method, to thereby obtain the heat-ray shielding transparent laminated base material of example 1.

As shown in table 1, the optical property of the heat-ray shielding transparent laminated base material shows as follows: the solar transmittance is 41.4% and a haze value is 0.6% when the visible light transmittance is 78.0%. The results are shown in table 1.

Examples 2 to 33

The heat-ray shielding transparent laminated base materials of examples 2 to 33 were obtained in the same manner as example 1, excluding a point that the kind and the concentration were changed, namely the concentration of the "particle a" and the kind/concentration of the selective wavelength absorbing material in the composition A for producing the heat-ray shielding film described in example 1.

Further, the optical properties of the heat-ray shielding transparent laminated base materials of examples 2 to 33 were measured in the same manner as example 1. The concentration of the "particle a" and the kind and the concentration of the selective wavelength absorbing material in examples 2 to 33 are shown in table 1. Further, results of measuring the optical property of the heat-ray shielding transparent laminated base materials of examples 2 to 33 are shown in table 1.

As the selective wavelength absorbing material, the abovementioned quinophthalone compound was used in examples 2 to 16, a nickel azo compound was used in examples 17 to 28, an isoindoline compound was used in example 29, a quinoxaline compound was used in example 30, a condensed diazo compound was used in example 31, an isoindolinone compound was used in example 32, and a bismuth vanadate compound was used in example 33.

Comparative Examples 1 to 4

The heat-ray shielding transparent laminated base materials of comparative examples 1 to 4 were obtained in the same manner as example 1, excluding a point that the concentration of the "particle a" in the composition A for producing the heat-ray shielding film described in example 1 was changed, and the selective wavelength absorbing material described in example 1 was not added. Further, the optical properties of the heat-ray shielding transparent laminated base materials of comparative examples 1 to 4 were measured in the same manner as example 1. The concentration of the "particle a" in comparative examples 1 to 4 are shown in table 2. Further, results of measuring the optical property of the heat-ray shielding transparent laminated base materials of comparative examples 1 to 4 are shown in table 2.

Comparative Examples 5 to 9

The heat-ray shielding transparent laminated base materials of comparative examples 5 to 9 were obtained in the same manner as example 1, excluding a point that the concentration of the "particle a" and the kind and concentration of the selective wavelength absorbing material in the composition A for producing the heat-ray shielding film described in example 1 were changed. The results are shown in table 2.

As the selective wavelength absorbing material, in a benzimidazolone compound was used in comparative example 5, and the quinophthalone compound was used in comparative examples 6 to 9.

Example 34

$RbNO_3$ 8.8 g was dissolved in 13.5 g of water, which was then added into 45.3 g of $H_2WO_4$ (equivalent to Rb/W (molar ratio)=0.33), and a mixture was thoroughly stirred and dried. The dried product was heated while supplying 2% $H_2$ gas using $N_2$ gas as a carrier gas, sintered for 30 minutes at a temperature of 800° C., and thereafter sintered for 90 minutes at the same temperature of 800° C. in a $N_2$ gas atmosphere, to thereby obtain Rb-added composite tungsten oxide particles (abbreviated as "particle b" hereafter).

The composition formula of the "particle b" was $Rb_{0.33}WO_3$, and the powder color was shown as L*: 36.3938, a*: −0.2385, and b*: −3.8318.

"Particle b": 20 mass %, "dispersant a": 10 mass %, and plasticizer a: 70% were weighed. They were charged into a paint shaker containing 0.3 mm-Ø $ZrO_2$ beads, and subjected to pulverization and dispersion treatment for 10 hours to obtain a plasticizer dispersion liquid of Rb-added composite tungsten oxide particles (abbreviated as particle dispersion liquid B hereafter). Here, the average dispersed particle size of the Rb-added tungsten oxide particles in the particle dispersion liquid B was measured using a Microtrac particle size analyzer produced by Nikkiso Co., Ltd., and it was found that the average dispersed particle size was 28 nm.

A composition B for producing a heat-ray shielding film was obtained by adding a predetermined amount of the particle dispersion liquid B and the selective wavelength absorbing material dispersion liquid α into a mixture in which 30 mass % of plasticizer a and 70 mass % of polyvinyl butyral resin were mixed, so that the concentration of the "particle b" in the mixture was 0.25 mass % and the concentration of the selective wavelength absorbing material was 0.0278 mass %. As a result, the weight ratio of the selective wavelength absorbing material and the Rb-added composite tungsten oxide particles (Rb-added composite tungsten oxide particles/selective wavelength absorbing material) in the composition B for producing the heat-ray shielding film was 0.25/0.0278=90/10. The composition B for producing the heat-ray shielding film was kneaded at 200° C. by a twin-screw extruder, and extruded from a T-die by a calendar roll method, to thereby obtain the heat-ray shielding film of example 34 as a 0.7 mm-thick sheet.

The obtained heat-ray shielding film was sandwiched between two facing inorganic glasses and integrally laminated together by a publicly-known method, to thereby obtain the heat-ray shielding transparent laminated base material of example 34. Further, the optical property of the heat-ray shielding transparent laminated base material of example 34 was measured in the same manner as example 1.

As shown in table 2, the optical property of the heat-ray shielding transparent laminated base material was shown as follows: the solar transmittance was 28.9%, and the haze value was 0.6% when the visible light transmittance was 70.9%.

Examples 35 to 39

The heat-ray shielding transparent laminated base materials of examples 35 to 39 were obtained in the same manner as example 34, excluding a point that the kind and the concentration were changed, namely the kind and the concentration of the selective wavelength absorbing material in the composition B for producing the heat-ray shielding film described in example 34. Further, the optical properties of the heat-ray shielding transparent laminated base materials of examples 35 to 39 were measured in the same manner as example 34. The concentration of the "particle b" and the kind and the concentration of the selective wavelength absorbing material in examples 35 to 39 are shown in table 2. Further, results of measuring the optical property of the heat-ray shielding transparent laminated base materials of examples 35 to 39 are shown in Table 2.

As the selective wavelength absorbing material, a nickel azo compound was used in example 35, an isoindoline compound was used in example 36, a quinoxaline compound was used in example 37, a condensed diazo compound was used in example 38, and an isoindolinone compound was used in example 39.

Comparative Example 10

The heat-ray shielding transparent laminated base material of comparative example 10 was obtained in the same manner as example 34, excluding a point that a selective wavelength absorbing material was not added. The results are shown in table 2.

Composition C for producing the heat-ray shielding film was obtained by adding a predetermined amount of the particle dispersion liquid A, the selective wavelength absorbing material dispersion liquid α, and the diimmonium compound CIR-RL produced by Japan Carlit Co., Ltd., as an infrared ray-absorbing organic compound, into a composition obtained by mixing 30 mass % of the plasticizer a and 70 mass % of the polyvinyl butyral resin described in example 1 so that the concentration of the "particle a" in the mixture was 0.125 mass %, the concentration of the selective wavelength absorbing material was 0.0139 mass %, and the infrared ray-absorbing organic compound was 0.0139 mass %. As a result, the weight ratio of the selective wavelength absorbing material and the composite tungsten oxide particles (composite tungsten oxide particles/selective wavelength absorbing material) in the composition C for producing the heat-ray shielding film was 0.125/0.0139=90/10. The composition C for producing the heat-ray shielding film was kneaded at 200° C. by a twin-screw extruder, and extruded from a T-die to obtain the heat-ray shielding film of example 40 by a calendar roll method, as a sheet having 0.7 mm thickness.

The obtained heat-ray shielding film was sandwiched between two facing inorganic glasses and integrally laminated by a publicly-known method to thereby obtain the heat-ray shielding transparent laminated base material of example 40. Further, the optical property of the heat-ray shielding transparent laminated base material of example 40 was measured in the same manner as example 1.

As shown in table 2, the optical property of the heat-ray shielding transparent laminated base material was as follows. The solar transmittance was 37.6% and the haze value was 0.6% when the visible light transmittance was 77.5%.

Examples 41 to 51

The heat-ray shielding transparent laminated base materials of examples 41 to 51 were obtained in the same manner as example 40, excluding a point that the kind and the concentration were changed, namely the kind and concentration of the selective wavelength absorbing material and the kind and concentration of the infrared ray-absorbing organic compound in the composition C for producing the heat-ray shielding film described in example 40. Further, the optical property of the heat-ray shielding transparent laminated base materials of examples 41 to 51 were measured in the same manner as example 40. The concentration of the "particle a", the kind and the concentration of the selective wavelength absorbing material, and the kind and the concentration of the infrared ray-absorbing organic compound in examples 41 to 51 are shown in table 2. Further, results of measuring the optical property of the heat-ray shielding transparent laminated base materials of examples 41 to 51 are shown in table 2.

As the selective wavelength absorbing material, the quinophthalone compound was used in examples 41 to 43, 48, 50, and 51, and a nickel azo compound was used in examples 44 to 47 and 49.

Meanwhile, as the infrared ray-absorbing organic compound, the abovementioned diimmonium compound was used in examples 41 to 47, 50, and 51, and a phthalocyanine compound was used in examples 48 and 49.

Example 52

An infrared ray-reflection film (Scotchtint S90 produced by Sumitomo 3M Limited: visible light transmittance: 89%, solar reflectance: 22%) was sandwiched between the heat-ray shielding film obtained in example 5 and a transparent PVB intermediate film, and further sandwiched between two facing inorganic glasses, and integrally laminated by a publicly-known method to obtain the heat-ray shielding transparent laminated base material of example 52.

Then, the optical property of the heat-ray shielding transparent laminated base material of example 52 was measured in the same manner as example 1. In this measurement, the optical property was measured from a glass surface in contact with the transparent PVB intermediate film.

The concentration of the "particle a", the kind and the concentration of the selective wavelength absorbing material, and the kind and the concentration of the infrared ray-absorbing organic compound in example 52 are shown in table 3. Further, results of measuring the optical property of the heat-ray shielding transparent laminated base material of example 52 are shown in Table 3.

Examples 53 to 55

The heat-ray shielding transparent laminated base materials of examples 53 to 55 were obtained by performing an operation similarly to example 52 using the infrared ray-reflection film of example 52 and the heat-ray shielding film of examples 6 to 8.

The optical property of the heat-ray shielding transparent laminated base materials of examples 53 to 55 were measured in the same manner as example 1. Then, the concentration of the "particle a", the kind and the concentration of the selective wavelength absorbing material, and the kind and the concentration of the infrared ray-absorbing organic compound in examples 53 to 55 are shown in table 3. Further, results of measuring the optical property of the heat-ray shielding transparent laminated base materials of examples 53 to 55 are shown in table 3.

TABLE 1

| | Composition for producing heat-ray-shielding film | | | | | | | |
|---|---|---|---|---|---|---|---|---|
| | Heat-ray-shielding fine particles | | Selective wavelength absorbing material | | | | Infrared ray-absorbing organic compound | |
| | Kind | Concentration (mass %) | Kind | Concentration (mass %) | 450 nm Transmittance (%) | 550 nm Transmittance (%) | Kind | concentration (mass %) |
| Example 1 | a | 0.15 | Quinophthalone | 0.0079 | 5.3 | 92.8 | — | — |
| Example 2 | a | 0.20 | Quinophthalone | 0.0105 | 5.3 | 92.8 | — | — |
| Example 3 | a | 0.25 | Quinophthalone | 0.0132 | 5.3 | 92.8 | — | — |
| Example 4 | a | 0.30 | Quinophthalone | 0.0158 | 5.3 | 92.8 | — | — |
| Example 5 | a | 0.15 | Quinophthalone | 0.0167 | 5.3 | 92.8 | — | — |
| Example 6 | a | 0.20 | Quinophthalone | 0.0222 | 5.3 | 92.8 | — | — |
| Example 7 | a | 0.25 | Quinophthalone | 0.0278 | 5.3 | 92.8 | — | — |
| Example 8 | a | 0.30 | Quinophthalone | 0.0333 | 5.3 | 92.8 | — | — |
| Example 9 | a | 0.15 | Quinophthalone | 0.0375 | 5.3 | 92.8 | — | — |
| Example 10 | a | 0.20 | Quinophthalone | 0.0500 | 5.3 | 92.8 | — | — |
| Example 11 | a | 0.25 | Quinophthalone | 0.0625 | 5.3 | 92.8 | — | — |
| Example 12 | a | 0.30 | Quinophthalone | 0.0750 | 5.3 | 92.8 | — | — |
| Example 13 | a | 0.15 | Quinophthalone | 0.0643 | 5.3 | 92.8 | — | — |
| Example 14 | a | 0.20 | Quinophthalone | 0.0857 | 5.3 | 92.8 | — | — |
| Example 15 | a | 0.25 | Quinophthalone | 0.1071 | 5.3 | 92.8 | — | — |
| Example 16 | a | 0.30 | Quinophthalone | 0.1286 | 5.3 | 92.8 | — | — |
| Example 17 | a | 0.15 | Nickel Azo | 0.0079 | 15 | 91.5 | — | — |
| Example 18 | a | 0.20 | Nickel Azo | 0.0105 | 15 | 91.5 | — | — |
| Example 19 | a | 0.25 | Nickel Azo | 0.0132 | 15 | 91.5 | — | — |
| Example 20 | a | 0.30 | Nickel Azo | 0.0158 | 15 | 91.5 | — | — |
| Example 21 | a | 0.15 | Nickel Azo | 0.0167 | 15 | 91.5 | — | — |
| Example 22 | a | 0.20 | Nickel Azo | 0.0222 | 15 | 91.5 | — | — |
| Example 23 | a | 0.25 | Nickel Azo | 0.0278 | 15 | 91.5 | — | — |
| Example 24 | a | 0.30 | Nickel Azo | 0.0333 | 15 | 91.5 | — | — |
| Example 25 | a | 0.15 | Nickel Azo | 0.0375 | 15 | 91.5 | — | — |
| Example 26 | a | 0.20 | Nickel Azo | 0.0500 | 15 | 91.5 | — | — |
| Example 27 | a | 0.25 | Nickel Azo | 0.0625 | 15 | 91.5 | — | — |
| Example 28 | a | 0.30 | Nickel Azo | 0.0750 | 15 | 91.5 | — | — |
| Example 29 | a | 0.25 | Isoindoline | 0.0278 | 33.5 | 91.5 | — | — |
| Example 30 | a | 0.25 | Quinoxaline | 0.0278 | 28.9 | 90.5 | — | — |
| Example 31 | a | 0.25 | Condensed diazo | 0.0278 | 36.7 | 91.3 | — | — |
| Example 32 | a | 0.25 | Isoindolinone | 0.0278 | 25.7 | 90.9 | — | — |
| Example 33 | a | 0.25 | Bismuth vanadate | 0.0278 | 40 | 90 | — | — |

| | Composition for producing heat-ray-shielding film | | Optical properties of heat-ray-shielding transparent laminated base material | | |
|---|---|---|---|---|---|
| | Mass ratio A ※1 w/w | Mass ratio B ※2 w/w | Visible light Transmittance (%) | Solar Transmittance (%) | Haze |
| Example 1 | 95/5 | — | 78.0 | 41.4 | 0.6 |
| Example 2 | 95/5 | — | 74.2 | 35.5 | 0.7 |
| Example 3 | 95/5 | — | 70.4 | 31.4 | 0.6 |
| Example 4 | 95/5 | — | 66.2 | 28.5 | 0.6 |
| Example 5 | 90/10 | — | 77.8 | 38.7 | 0.6 |
| Example 6 | 90/10 | — | 74.0 | 32.3 | 0.5 |
| Example 7 | 90/10 | — | 70.6 | 28.5 | 0.6 |
| Example 8 | 90/10 | — | 66.1 | 25.6 | 0.6 |
| Example 9 | 80/20 | — | 77.6 | 39.4 | 0.6 |
| Example 10 | 80/20 | — | 73.6 | 32.7 | 0.5 |
| Example 11 | 80/20 | — | 70.4 | 29.3 | 0.7 |
| Example 12 | 80/20 | — | 65.6 | 25.8 | 0.6 |
| Example 13 | 70/30 | — | 77.2 | 41.4 | 0.6 |
| Example 14 | 70/30 | — | 73.4 | 36.3 | 0.5 |
| Example 15 | 70/30 | — | 69.2 | 31.5 | 0.6 |
| Example 16 | 70/30 | — | 65.4 | 28.8 | 0.6 |
| Example 17 | 95/5 | — | 77.7 | 41.9 | 0.5 |
| Example 18 | 95/5 | — | 73.9 | 36.0 | 0.7 |
| Example 19 | 95/5 | — | 70.3 | 31.9 | 0.6 |
| Example 20 | 95/5 | — | 65.9 | 29.0 | 0.6 |
| Example 21 | 90/10 | — | 77.5 | 39.2 | 0.5 |
| Example 22 | 90/10 | — | 73.7 | 32.8 | 0.8 |
| Example 23 | 90/10 | — | 70.2 | 29.2 | 0.6 |
| Example 24 | 90/10 | — | 65.8 | 26.1 | 0.8 |
| Example 25 | 80/20 | — | 77.3 | 39.9 | 0.7 |

TABLE 1-continued

| | | | | | |
|---|---|---|---|---|---|
| Example 26 | 80/20 | — | 73.3 | 33.2 | 0.6 |
| Example 27 | 80/20 | — | 70.1 | 258 | 0.5 |
| Example 28 | 80/20 | — | 65.3 | 26.3 | 0.8 |
| Example 29 | 90/10 | — | 70.4 | 32.1 | 0.6 |
| Example 30 | 90/10 | — | 70.5 | 31.4 | 0.5 |
| Example 31 | 90/10 | — | 70.1 | 30.9 | 0.6 |
| Example 32 | 90/10 | — | 70.3 | 30.6 | 0.6 |
| Example 33 | 90/10 | — | 70.2 | 32.3 | 0.7 |

TABLE 2

| | Composition for producing heat-ray-shielding film | | | | | | | |
|---|---|---|---|---|---|---|---|---|
| | Heat-ray-shielding fine particles | | Selective wavelength absorbing material | | | | Infrared ray-absorbing organic compound | |
| | Kind | Concentration (mass %) | Kind | Concentration (mass %) | 450 nm Transmittance (%) | 550 nm Transmittance (%) | Kind | concentration (mass %) |
| Example 34 | b | 0.25 | Quinophthalone | 0.0278 | 5.3 | 92.8 | — | — |
| Example 35 | b | 0.25 | Nickel Azo | 0.0278 | 15 | 91.5 | — | — |
| Example 36 | b | 0.25 | Isoindolinone | 0.0278 | 33.5 | 91.5 | — | — |
| Example 37 | b | 0.25 | Quinoxaline | 0.0278 | 28.9 | 90.5 | — | — |
| Example 38 | b | 0.25 | Condensed diazo | 0.0278 | 36.7 | 91.3 | — | — |
| Example 39 | b | 0.25 | Isoindolinone | 0.0278 | 25.7 | 90.9 | — | — |
| Example 40 | a | 0.125 | Quinophthalone | 0.0139 | 5.3 | 92.8 | Diimmonium compound | 0.013889 |
| Example 41 | a | 0.167 | Quinophthalone | 0.0185 | 5.3 | 92.8 | Diimmonium compound | 0.018519 |
| Example 42 | a | 0.208 | Quinophthalone | 0.0231 | 5.3 | 92.8 | Diimmonium compound | 0.023148 |
| Example 43 | a | 0.25 | Quinophthalone | 0.0278 | 5.3 | 92.8 | Diimmonium compound | 0.027778 |
| Example 44 | a | 0.125 | Nickel Azo | 0.0139 | 5.3 | 92.8 | Diimmonium compound | 0.013889 |
| Example 45 | a | 0.167 | Nickel Azo | 0.0185 | 5.3 | 92.8 | Diimmonium compound | 0.081519 |
| Example 46 | a | 0.208 | Nickel Azo | 0.0231 | 5.3 | 92.8 | Diimmonium compound | 0.023148 |
| Example 47 | a | 0.25 | Nickel Azo | 0.0278 | 5.3 | 92.8 | Diimmonium compound | 0.027778 |
| Example 48 | a | 0.208 | Quinophthalone | 0.0231 | 5.3 | 92.8 | Phthalocyanine compound | 0.023148 |
| Example 49 | a | 0.208 | Nickel Azo | 0.0231 | 5.3 | 92.8 | Phthalocyanine compound | 0.023148 |
| Example 50 | a | 0.067 | Quinophthalone | 0.0074 | 5.3 | 92.8 | Diimmonium compound | 0.067 |
| Example 51 | a | 0.233 | Quinophthalone | 0.0259 | 5.3 | 92.8 | Diimmonium compound | 0.012263 |
| Com* Example 1 | a | 0.15 | — | — | — | — | — | — |
| Com* Example 2 | a | 0.20 | — | — | — | — | — | — |
| Com* Example 3 | a | 0.25 | — | — | — | — | — | — |
| Com* Example 4 | a | 0.30 | — | — | — | — | — | — |
| Com* Example 5 | a | 0.25 | Benzimidazolo | 0.0278 | 25.5 | 80.7 | — | — |
| Com* Example 6 | a | 0.15 | Quinophthalone | 0.1000 | 5.3 | 92.8 | — | — |
| Com* Example 7 | a | 0.20 | Quinophthalone | 0.1333 | 5.3 | 92.8 | — | — |
| Com* Example 8 | a | 0.25 | Quinophthalone | 0.1667 | 5.3 | 92.8 | — | — |
| Com* Example 9 | a | 0.30 | Quinophthalone | 0.2000 | 5.3 | 92.8 | — | — |
| Com* Example 10 | b | 0.25 | — | — | — | — | — | — |

TABLE 2-continued

| | Composition for producing heat-ray-shielding film | | Optical properties of heat-ray-shielding transparent laminated base material | | |
|---|---|---|---|---|---|
| | Mass ratio A ※1 w/w | Mass ratio B ※2 w/w | Visible light Transmittance (%) | Solar Transmittance (%) | Haze |
| Example 34 | 90/10 | — | 70.9 | 28.9 | 0.6 |
| Example 35 | 90/10 | — | 70.7 | 29.7 | 0.5 |
| Example 36 | 90/10 | — | 70.5 | 32.3 | 0.8 |
| Example 37 | 90/10 | — | 70.1 | 31.3 | 0.9 |
| Example 38 | 90/10 | — | 70.3 | 31.1 | 0.7 |
| Example 39 | 90/10 | — | 70.2 | 30.7 | 0.7 |
| Example 40 | 90/10 | 90/10 | 77.5 | 37.6 | 0.6 |
| Example 41 | 90/10 | 90/10 | 73.8 | 31.2 | 0.5 |
| Example 42 | 90/10 | 90/10 | 70.4 | 27.4 | 0.6 |
| Example 43 | 90/10 | 90/10 | 65.8 | 24.5 | 0.6 |
| Example 44 | 90/10 | 90/10 | 77.3 | 37.6 | 0.5 |
| Example 45 | 90/10 | 90/10 | 73.5 | 31.2 | 0.8 |
| Example 46 | 90/10 | 90/10 | 70.1 | 27.8 | 0.6 |
| Example 47 | 90/10 | 90/10 | 65.6 | 24.7 | 0.8 |
| Example 48 | 90/10 | 90/10 | 70.3 | 27.9 | 0.6 |
| Example 49 | 90/10 | 90/10 | 70 | 28.7 | 0.6 |
| Example 50 | 90/10 | 50/50 | 70.5 | 31.5 | 0.6 |
| Example 51 | 90/10 | 95/5 | 70.7 | 31.2 | 0.6 |
| Com* Example 1 | 100/0 | — | 78.2 | 44.1 | 0.7 |
| Com* Example 2 | 100/0 | — | 74.4 | 38.2 | 0.7 |
| Com* Example 3 | 100/0 | — | 70.2 | 33 | 0.6 |
| Com* Example 4 | 100/0 | — | 66.5 | 30 | 0.5 |
| Com* Example 5 | 90/10 | — | 66.7 | 35.3 | 0.6 |
| Com* Example 6 | 60/40 | — | 76.8 | 42.9 | 0.5 |
| Com* Example 7 | 60/40 | — | 73.1 | 37.8 | 0.6 |
| Com* Example 8 | 60/40 | — | 68.8 | 33.2 | 0.5 |
| Com* Example 9 | 60/40 | — | 64.8 | 30 | 0.6 |
| Com* Example 10 | 100/0 | — | 71 | 33.2 | 0.7 |

※1: Composite tungsten oxide fine particles/selective wavelength absorbing material
※2: Composite tungsten oxide fine particles/infrared ray-absorbing organic compound
Com*: Comparative example

TABLE 3

| | Composition for producing heat-ray-shielding film | | | | | | |
|---|---|---|---|---|---|---|---|
| | Heat-ray-shielding fine particles | | Selective wavelength absorbing material | | | | Infrared ray-absorbing organic compound | |
| | Kind | Concentration (mass %) | Kind | Concentration (mass %) | 450 nm Transmittance (%) | 550 nm Transmittance (%) | Kind | concentration (mass %) |
| Example 52 | a | 0.15 | Quinophthalone | 0.0167 | 5.3 | 92.8 | — | — |
| Example 53 | a | 0.20 | Quinophthalone | 0.0222 | 5.3 | 92.8 | — | — |
| Example 54 | a | 0.25 | Quinophthalone | 0.278 | 5.3 | 92.8 | — | — |
| Example 55 | a | 0.30 | Quinophthalone | 0.0333 | 5.3 | 92.8 | — | — |

| | Composition for producing heat-ray-shielding film | | Optical properties of heat-ray-shielding transparent laminated base material ※3 | | |
|---|---|---|---|---|---|
| | Mass ratio A ※1 w/w | Mass ratio B ※2 w/w | Visible light Transmittance (%) | Solar Transmittance (%) | Haze |
| Example 52 | 90/10 | — | 77.1 | 36.7 | 0.6 |
| Example 53 | 90/10 | — | 73.2 | 30.5 | 0.7 |
| Example 54 | 90/10 | — | 70.0 | 27.0 | 0.7 |
| Example 55 | 90/10 | — | 65.6 | 24.3 | 0.7 |

※1: Complexed tungsten oxide fine particles/selective wavelength absorbing material
※2: Composite tungsten oxide fine particles/infrared ray-absorbing organic compound
※3: Structure of transparent laminated base material: glass/transparent PVB film/infrared ray-reflective film/heat-ray-shielding film/glass?

Evaluation of Examples 1 to 16 and Comparative Examples 1 to 4 and 6 to 9

In examples 1 to 16, lower solar transmittance was obtained by using the selective wavelength absorbing material together with the composite tungsten oxide particles.

The results are described using FIG. 1.

FIG. 1 is a graph showing the solar transmittance on the vertical axis and the visible light transmittance on the horizontal axis. In the graph, data of examples 1 to 4 is plotted by -◇- showing that the weight ratio A is 95/5, which is the weight ratio (composite tungsten oxide particles a/selective wavelength absorbing material <quinophthalone compound>), data of examples 5 to 8 is plotted by -□- showing that the weight ratio is 90/10, data of examples 9 to 12 is plotted by -Δ-showing that the weight ratio is 80/20, data of examples 13 to 16 is plotted by -X- showing that the weight ratio is 70/30, data of comparative examples 1 to 4 is plotted by -*-showing that the weight ratio is 100/0, and data of comparative examples 6 to 9 is plotted by -+- showing that the weight ratio is 60/40.

From FIG. 1, it was found that by setting the weight ratio in the range of 99/1 to 70/30, namely the weight ratio of the selective wavelength absorbing material and the composite tungsten oxide particles (composite tungsten oxide particles a/selective wavelength absorbing material <quinophthalone compound>) as shown in examples 1 to 16, higher heat shielding performance can be obtained than a case of using the composite tungsten oxide particles alone as shown in comparative examples 1 to 4.

Meanwhile, it was found that if the weight ratio (composite tungsten oxide particles a/selective wavelength absorbing material <quinophthalone compound>) was 60/40 as shown in comparative examples 6 to 9, which was not in the range of 99/1 to 70/30, the heat shielding property was deteriorated compared with the case of using the composite tungsten oxide particles alone.

Evaluation of Examples 17 to 28 and Comparative Examples 1 to 4

In examples 17 to 28 as well, lower solar transmittance was obtained by using the selective wavelength absorbing material together with the composite tungsten oxide particles.

Figure 2:
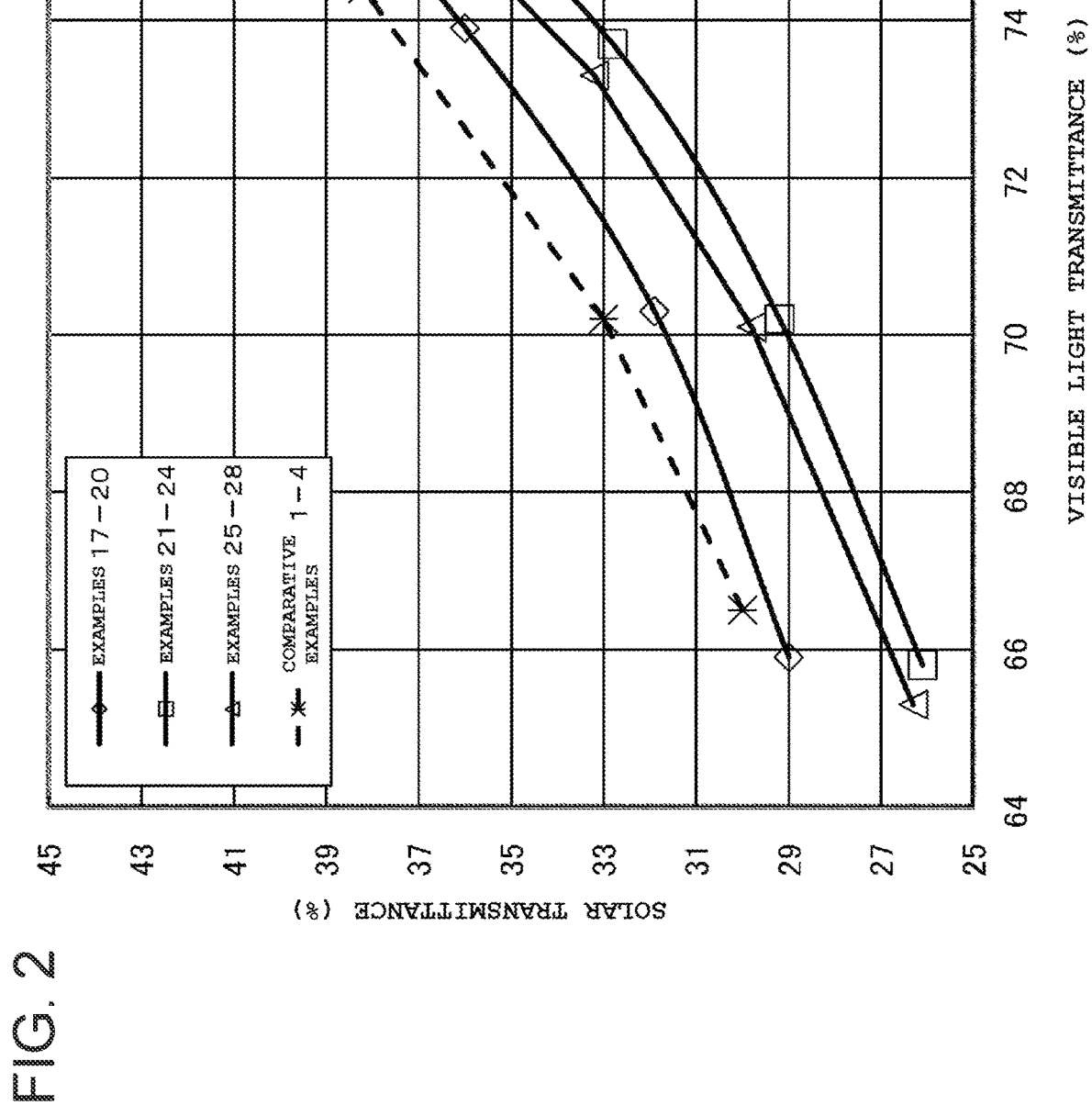
FIG. 2 is a graph showing the relationship between the visible light transmittance and the solar transmittance of the heat-ray shielding transparent laminated base material of examples 17 to 28 and comparative examples 1 to 4.

The results are described using FIG. 2.

In the graph of FIG. 2, similarly to FIG. 1, data of examples 17 to 20 is plotted by -◇- showing that the weight ratio A is 95/5, namely the weight ratio (composite tungsten oxide particles a/selective wavelength absorbing material <nickel azo compound>), data of examples 21 to 24 is plotted by -□- showing that the weight ratio is 90/10, data of examples 25 to 28 is plotted by -Δ- showing that the weight ratio is 80/20, and data of comparative examples 1 to 4 is plotted by -*- showing that the weight ratio is 100/0.

From FIG. 2, it was found that by setting the weight ratio in the range of 99/1 to 70/30, which is the weight ratio of the selective wavelength absorbing material and the composite tungsten oxide particles (composite tungsten oxide particles a/selective wavelength absorbing material <nickel azo compound>), higher heat shielding performance can be obtained than the case of using the composite tungsten oxide particles alone as shown in comparative examples 1 to 4.

Evaluation of Examples 29 to 33 and Comparative Examples 1 to 4 and 5

In examples 29 to 33, lower solar transmittance was obtained by using the selective wavelength absorbing material together with the composite tungsten oxide particles.

Figure 3:
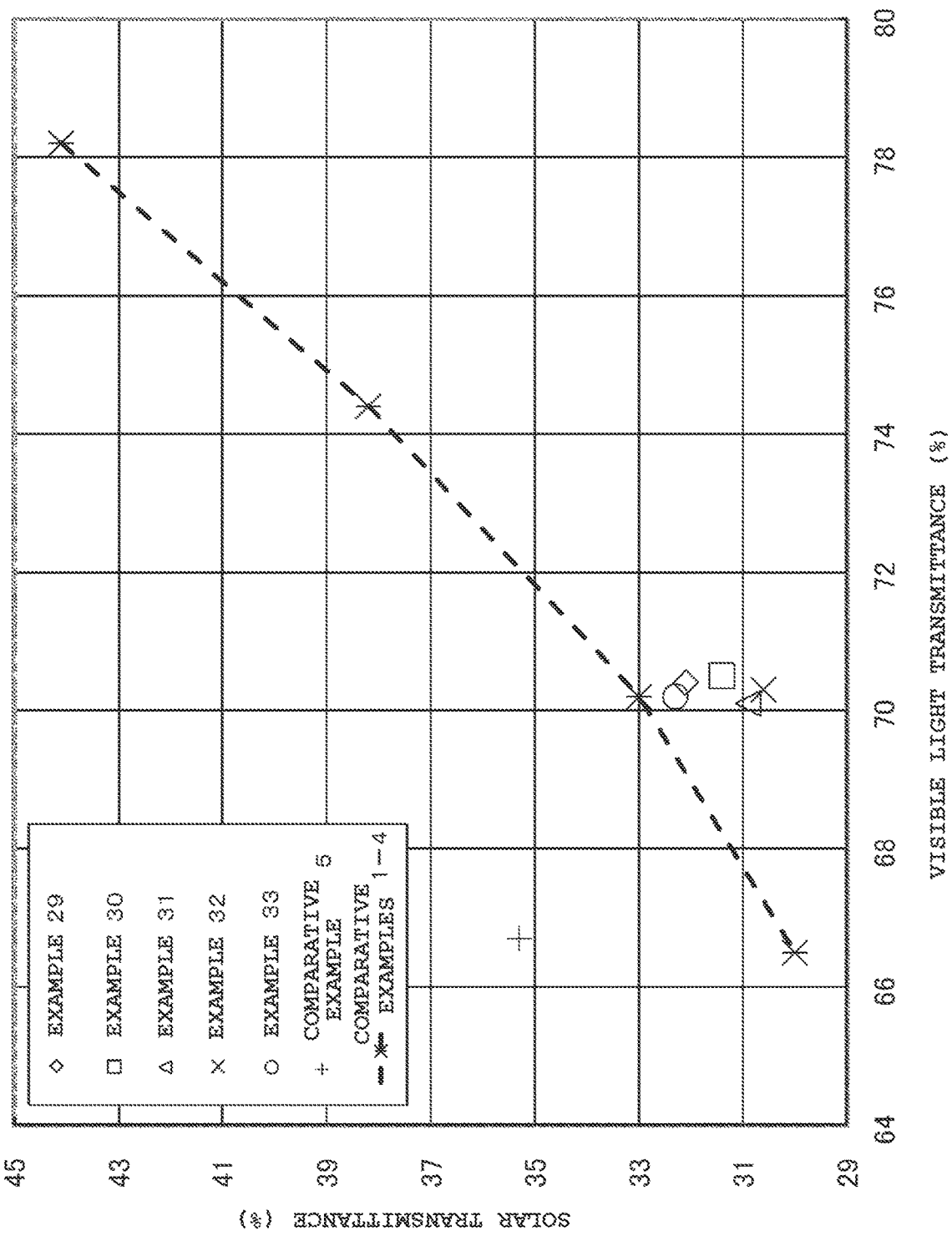
FIG. 3 is a graph showing the relationship between the visible light transmittance and the solar transmittance of the heat-ray shielding transparent laminated base material of examples 29 to 33 and comparative examples 1 to 4 and 5.

The results are described using FIG. 3.

In the graph of FIG. 3, similarly to FIG. 1, data of example 29 is plotted by -◇- showing that the selective wavelength absorbing material is an isoindoline compound, data of example 30 is plotted by -□- showing that the selective wavelength absorbing material is a quinoxaline compound, data of example 31 is plotted by -Δ- showing that the selective wavelength absorbing material is a condensed diazo compound, data of example 32 is plotted by -◇- showing that the selective wavelength absorbing material is an isoindolinone compound, data of example 33 is plotted by -○- showing that the selective wavelength absorbing material is a bismuth vanadate compound, data of comparative example 5 is plotted by -+- showing that the selective wavelength absorbing material is a benzimidazolone compound, and data of comparative examples 1 to 4 is plotted by -*- showing that the selective wavelength absorbing material is not used.

From FIG. 3, it was found that higher shielding performance could be obtained than the case of using the composite tungsten oxide particles alone, by using the selective wavelength absorbing material together with the composite tungsten oxide particles, the selective wavelength absorbing material having the following transmission profile: the transmittance of the light having the wavelength of 550 nm is 90% or more and the transmittance of the light having the wavelength of 450 nm is 40% or less.

Meanwhile, comparative example 5 shows the following transmission profile of the used selective wavelength absorbing material: the transmittance of the light having the wavelength of 550 nm is 90% or less and the transmittance of the light having the wavelength of 450 nm is 40% or more, which is outside the range defined by the present invention. Therefore, heat shielding property was deteriorated compared with the case of using the composite tungsten oxide particles alone.

Evaluation of Examples 34 to 39 and Comparative Example 10

In examples 34 to 39, lower solar transmittance was obtained by using a selective wavelength absorbing material together with the Rb-containing composite tungsten oxide particles. Further, it was found that by using a selective wavelength absorbing material having a transmission profile in which a transmittance of a light having a wavelength of 550 nm is 90% or more and a transmittance of a light having a wavelength of 450 nm is 40% or less, together with the abovementioned Rb-containing composite tungsten oxide particles, a higher heat shielding performance can be obtained than a case of using the Rb-containing composite tungsten oxide particles alone as described in comparative example 10.

Evaluation of Examples 5 to 8 and 40 to 47, and Comparative Examples 1 to 4

In examples 40 to 47, lower solar transmittance was obtained by using the selective wavelength absorbing material and the infrared-ray absorbing organic compound, together with the composite tungsten oxide particles.

Figure 4:
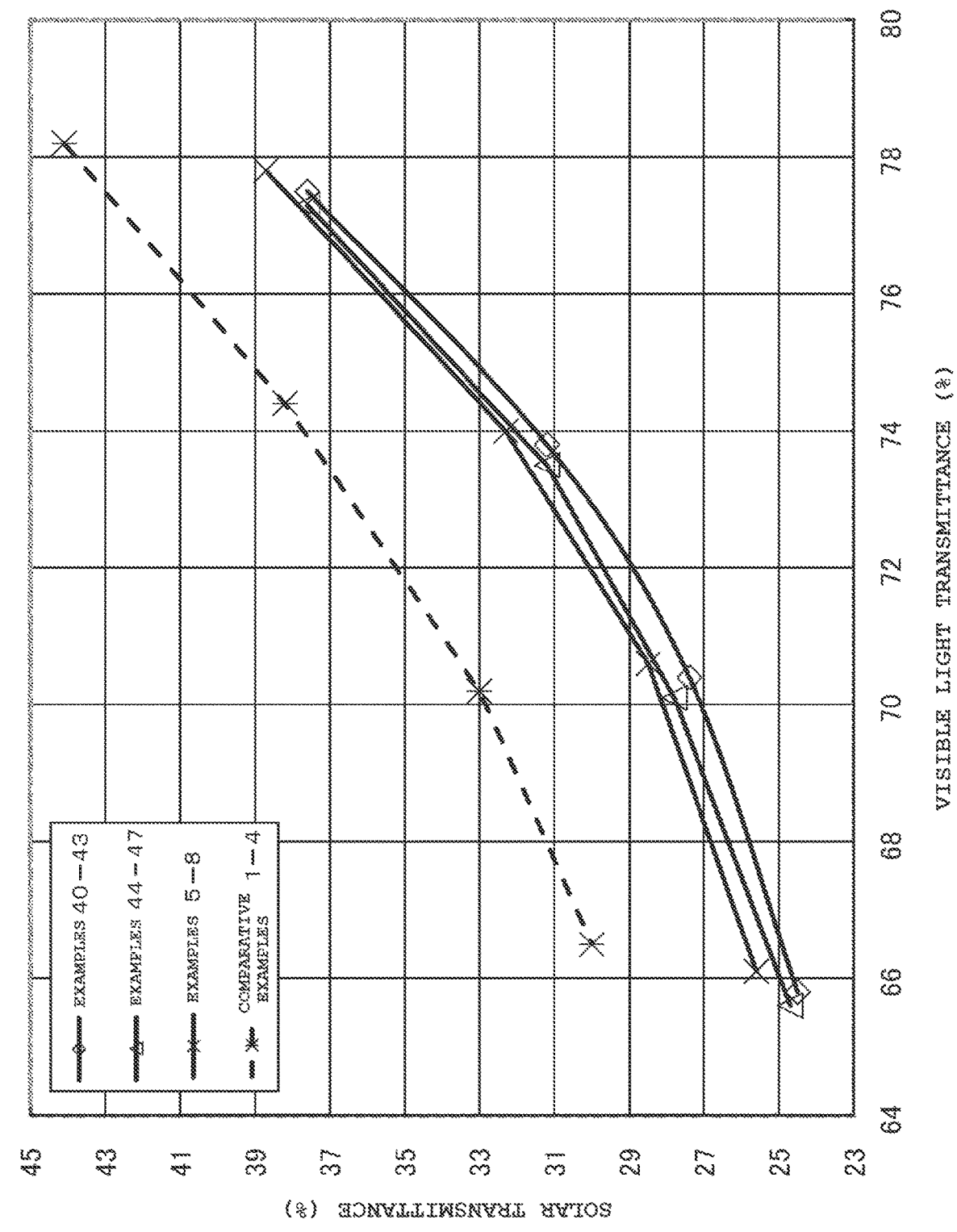
FIG. 4 is a graph showing the relationship between the visible light transmittance and solar transmittance of the heat-ray shielding transparent laminated base material of examples 5 to 8 and 40 to 47 and comparative examples 1 to 4.

The results are described using FIG. 4.

In the graph of FIG. 4, similarly to FIG. 1, data of examples 40 to 43 is plotted by -◇- showing that the weight ratio A (composite tungsten oxide particles/selective wavelength absorbing material <quinophthalone compound>) is 90/10 and the weight ratio B (composite tungsten oxide particles/infrared ray-absorbing organic compound <diimmonium compound>) is 90/10, data of examples 44 to 47 is plotted by -Δ- showing that the weight ratio A (composite tungsten oxide particles/selective wavelength absorbing material <nickel azo compound>) is 90/10 and the weight ratio B (composite tungsten oxide particles/infrared ray-absorbing organic compound <diimmonium compound>) is 90/10, data of examples 5 to 8 is plotted by -X- showing that the weight ratio A (composite tungsten oxide particles/selective wavelength absorbing material <quinophthalone compound>) is 90/10, and data of comparative examples 1 to 4 is plotted by -*- showing that the weight ratio is 100/0.

From FIG. 4, it was found that by using the selective wavelength absorbing material and the infrared ray-absorbing organic compound, together with the composite tungsten oxide particles, higher heat shielding performance could be obtained than the case of using the composite tungsten oxide particles alone, or the case of using the selective wavelength absorbing material together with the composite tungsten oxide particles.

Evaluation of Examples 48 to 51 and Comparative Examples 1 to 4

In examples 48 to 51, the selective wavelength absorbing material and the infrared ray-absorbing organic compound were used together with the composite tungsten oxide particles. In examples 48 to 51, by using the selective wavelength absorbing material and the infrared-ray absorbing organic compound together with the composite tungsten oxide particles, lower solar transmittance was obtained than the transmittance of comparative examples 1 to 4 in which the composite tungsten oxide particles are not used together. Also, by using the selective wavelength absorbing material and the infrared-ray absorbing organic compound together with the composite tungsten oxide particles, it was found that higher shielding performance could be obtained, compared with the case of using the composite tungsten oxide particles alone.

Here, the weight ratio A (composite tungsten oxide particles/selective wavelength absorbing material <quinophthalone compound>) was 90/10, the weight ratio B (composite tungsten oxide particles/infrared ray-absorbing organic compound <phthalocyanine compound>) was 90/10, in example 48, and the weight ratio A (composite tungsten oxide particles/selective wavelength absorbing material <nickel azo compound>) was 90/10 and the weight ratio B (composite tungsten oxide particles/infrared ray-absorbing organic compound <phthalocyanine compound>) was 90/10 in example 49, and the weight ratio A (composite tungsten oxide particles/selective wavelength absorbing material <quinophthalone compound>) was 90/10 and the weight ratio B (composite tungsten oxide particles/infrared ray-absorbing organic compound <diimmonium compound>) was 50/50 in example 50, and the weight ratio A (composite tungsten oxide particles/selective wavelength absorbing material <quinophthalone compound>) was 90/10 and the weight ratio B (composite tungsten oxide particles/infrared ray-absorbing organic compound <diimmonium compound>) was 95/5 in example 51.

Evaluation of Examples 52 to 55

In examples 52 to 55, the selective wavelength absorbing material and the infrared ray-reflection film were used together with the composite tungsten oxide particles. In examples 52 to 55, by using the tungsten oxide particles together, lower solar transmittance was obtained than the solar transmittance of comparative examples 1 to 4 in which the composite tungsten oxide particles were not used together. Also, by using the selective wavelength absorbing material and the infrared-ray reflection film together with the composite tungsten oxide particles, it was found that higher heat shielding performance could be obtained than the case of using the composite tungsten oxide particles alone.

The invention claimed is:

1. A heat-ray shielding film comprising a compound having a heat-ray shielding function, a selective wavelength absorbing material, a polyvinyl acetal resin, and a plasticizer, wherein the compound having the heat-ray shielding function consists of composite tungsten oxide particles expressed by a general formula MyWOz (wherein M is an element of one or more selected from Cs, Rb, K, Tl, In, Ba, Li, Ca, Sr, Fe, Sn, Al, and Cu, satisfying $0.1 \leq y \leq 0.5$, and $2.2 \leq z \leq 3.0$) and having a hexagonal crystal structure, the selective wavelength absorbing material has a transmission profile in which a transmittance of a light having a wavelength of 550 nm is 90% or more, and a transmittance of a light having a wavelength of 450 nm is 40% or less, the selective wavelength absorbing material is a quinoxaline compound, a weight ratio of the compound having a heat-ray shielding function and the selective wavelength absorbing material (compound having a heat-ray shielding function/selective wavelength absorbing material) is in a range of 99/1 to 70/30.

2. The heat-ray shielding film according to claim 1, wherein the composite tungsten oxide particles are particles having an average particle size of 40 nm or less.

3. The heat-ray shielding film according to claim 1, wherein the selective wavelength absorbing material has a transmission profile in which transmittance of a light having a wavelength of 550 nm is 90% or more and a transmittance of a light having a wavelength of 450 nm is 15% or less.

4. The heat-ray shielding film according to claim 1, further comprising a dispersant having an amine-containing group as functional groups, and a thermal decomposition temperature of 200° C. or more measured by a simultaneous thermogravimetry and differential thermal analysis measurement apparatus.

5. A heat-ray shielding transparent laminated base material wherein the heat-ray shielding film of claim 1 is arranged between several transparent base materials.

6. The heat-ray shielding transparent laminated base material according to claim 5, wherein an infrared ray-reflection film having a visible light transmittance of 88% or more and a solar reflectance of 21% or more is further arranged between several transparent base materials.

7. The heat-ray shielding transparent laminated base material according to claim 5, wherein at least one of the several transparent base materials is glass.

8. The heat-ray shielding transparent laminated base material according to claim 5, wherein a visible light transmittance calculated based on JIS R 3106 is 70% or more, and a solar transmittance is 32.5% or less.

9. An automobile comprising the heat-ray shielding transparent laminated base material of claim 5 as a window material.

* * * * *